US012750346B2

(12) United States Patent
Obulareddy et al.

(10) Patent No.: US 12,750,346 B2
(45) Date of Patent: Sep. 29, 2026

(54) ZERO TRUST NETWORK ACCESS CONNECTOR FOR CUSTOMER PREMISES

(71) Applicant: Sophos Limited, Abingdon (GB)

(72) Inventors: Venkata Suresh Reddy Obulareddy, Bangalore (IN); Joju Francis Olakengil, Bangalore (IN)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 18/823,903

(22) Filed: Sep. 4, 2024

(65) Prior Publication Data

US 2025/0080503 A1 Mar. 6, 2025

(30) Foreign Application Priority Data

Sep. 5, 2023 (IN) ............................ 202311059706

(51) Int. Cl.
*H04L 9/40* (2022.01)
*H04L 43/10* (2022.01)

(52) U.S. Cl.
CPC ............ *H04L 63/029* (2013.01); *H04L 43/10* (2013.01); *H04L 63/0236* (2013.01); *H04L 63/0281* (2013.01); *H04L 63/102* (2013.01)

(58) Field of Classification Search
CPC ............... H04L 63/029; H04L 63/0236; H04L 63/0281; H04L 63/102; H04L 63/0272; H04L 43/10
See application file for complete search history.

(56) References Cited

U.S. PATENT DOCUMENTS 12,314,430 B1 * 5/2025 Hardt .................. G06F 21/6245
2010/0174939 A1 7/2010 Vexler
2014/0280809 A1 * 9/2014 Li ......................... H04L 41/344 709/222
2018/0062875 A1 3/2018 Tumuluru
2018/0063743 A1 3/2018 Tumuluru et al.
2019/0327312 A1 10/2019 Gupta et al.
2021/0051178 A1 * 2/2021 Kuppannan ............. H04L 63/20
2021/0126965 A1 4/2021 Patil et al.
2022/0029965 A1 * 1/2022 Chanak ................. H04L 63/029
2022/0083602 A1 * 3/2022 Agaon ................ G06F 16/9038
2022/0174004 A1 6/2022 Filsfils et al.
2022/0353244 A1 11/2022 Kahn et al.
(Continued)

OTHER PUBLICATIONS

EPO, , "EP Application No. 24198707.2 Extended Search Report mailed Jan. 16, 2025", NPL-1193 , 13 pages.
(Continued)

*Primary Examiner* — Sangseok Park
(74) *Attorney, Agent, or Firm* — Strategic Patents, P.C.

(57) ABSTRACT

A zero trust network access (ZTNA) system provides secure access to applications hosted on a customer premises. The ZTNA system is modified to facilitate distributed and/or cloud-based deployments of components for a control plane and a data plane that cooperate to support a network-accessible front end for the customer's locally hosted applications. A customer-side connector can be further simplified for deployment by moving ZTNA components for, e.g., secure tunneling, authorization, and authentication into the cloud-based infrastructure, and by managing deployment and configuration of the connector through a threat management facility for the customer premises.

20 Claims, 11 Drawing Sheets

(56) References Cited

U.S. PATENT DOCUMENTS

| | | | |
|---|---|---|---|
| 2022/0358240 | A1 | 11/2022 | Neal et al. |
| 2023/0117962 | A1 | 4/2023 | Kaimal et al. |
| 2023/0344733 | A1 | 10/2023 | Tourrilhes et al. |
| 2023/0353567 | A1 | 11/2023 | Prunier et al. |
| 2024/0111821 | A1 | 4/2024 | Dogaru et al. |
| 2024/0214319 | A1 | 6/2024 | Rodriguez Natal et al. |
| 2024/0348459 | A1 | 10/2024 | Narayanaswamy et al. |
| 2024/0356918 | A1 | 10/2024 | Darbarwar et al. |
| 2024/0406169 | A1 | 12/2024 | Prunier et al. |
| 2025/0023915 | A1* | 1/2025 | Koikara .............. H04L 63/0281 |
| 2025/0047759 | A1 | 2/2025 | Parla et al. |
| 2025/0080501 | A1 | 3/2025 | Katyal et al. |
| 2025/0080504 | A1 | 3/2025 | Obulareddy et al. |

OTHER PUBLICATIONS

USPTO, , "U.S. Appl. No. 18/823,936 Non-Final Office Action mailed Jan. 15, 2026", NPL-1253 , 23 pages.

USPTO, , "U.S. Appl. No. 18/823,962 Non-Final Office Action mailed Mar. 13, 2026", NPL-1254 , 26 pages.

USPTO, , "U.S. Appl. No. 18/823,936 Final Office Action mailed Jun. 18, 2026", , 25 pages.

* cited by examiner

ZERO TRUST NETWORK ACCESS CONNECTOR FOR CUSTOMER PREMISES

RELATED APPLICATIONS

This application claims priority to Indian Prov. App. No. 202311059706 filed on Sep. 5, 2023, the entire content of which is hereby incorporated by reference.

This application is also related to the following commonly-owned U.S. Patent applications each filed on Sep. 4, 2024, and each incorporated herein by reference in its entirety: U.S. patent application Ser. No. 18/823,936 and U.S. patent application Ser. No. 18/823,962.

BACKGROUND

There remains a need for improved techniques for deploying and managing zero trust network access applications with a cloud-based security infrastructure, and for improved connectors to couple end users to the zero trust network access applications.

SUMMARY

A zero trust network access (ZTNA) system provides secure access to applications hosted on a customer premises. The ZTNA system is modified to facilitate distributed and/or cloud-based deployments of components for a control plane and a data plane that cooperate to support a network-accessible front end for the customer's locally hosted applications. A customer-side connector can be further simplified for deployment by moving ZTNA components for, e.g., secure tunneling, authorization, and authentication into the cloud-based infrastructure, and by managing deployment and configuration of the connector through a threat management facility for the customer premises.

In one aspect, a system disclosed herein may include: a network component deployed on a customer premises, the network component managing access to the customer premises from an external network; and a threat management facility. The threat management facility may be configured to: remotely provide security services for the customer premises; remotely manage the network component on the customer premises through a secure connection; and provide a web based user interface for a user to manage the network component though the threat management facility. The system may further include an application hosted on the customer premises, and a data plane for zero trust network access, where: the data plane is deployed in a cloud platform external to the customer premises, the cloud platform includes authentication components and authorization components for zero trust network access through the data plane, and the cloud platform includes tunnel components for creating secure tunnels for zero trust network access traffic. The system may further include a connector, where: the connector is deployed as a binary executing on the network component, the threat management facility associates the connector with the network component, the threat management facility provides management of the connector to the user through the web based user interface of the threat management facility, the connector is configured to communicate with the data plane through a secure tunnel created using the tunnel components of the cloud platform, the connector is configured to manage zero trust network access to the application through the data plane using the authentication components and the authorization components of the cloud platform, and the connector is further configured to controllably support zero trust network access to the application through the network component. The network component may include a firewall for the customer premises. The connector may be configurable through the web based user interface of the threat management facility to provide access to the application through either a first endpoint connection from an external network to the firewall on the customer premises or a second endpoint connection from the external network to the data plane for zero trust network access.

In one aspect, a computer program product disclosed herein may include computer executable code embodied in non-transitory computer readable media that, when executing on one or more computing devices, causes the one or more computing devices to perform the steps of: storing authentication components and authorization components for a data plane of a cloud-based zero trust network access service on a cloud platform; storing a connector for zero trust network access on a customer premises; coupling the connector to a threat management facility; receiving configuration information for the connector from the threat management facility, the configuration information identifying an application on the customer premises to offer as a zero trust network access service; coupling the connector through a secure tunnel to the cloud platform; coupling the connector to the application on the customer premises; and managing zero trust network access to the application by a user through the data plane by authorizing and authenticating the user for the application with the authentication components and authorization components executing on the cloud platform.

Implementations may include one or more of the following features. The application may include one or more of a productivity application, a database application, and a financial application. The authentication components may include at least one Open Authorization 2.0 proxy. The authorization components may include at least one Open Policy Agent. The data plane on the cloud platform may support agentless application access to the application and agent-based application access to the application. The connector may include a data plane client for secure communications with the data plane of the cloud-based zero trust network access service. The connector may include a cloud agent for secure communications with the threat management facility. The computer program product may include code that performs the step of executing the connector on a firewall on the customer premises. The connector may periodically transmit a heartbeat to the threat management facility containing health status information for the firewall.

In one aspect, a method disclosed herein may include: executing a connector for zero trust network access on a firewall of a customer premises; coupling the connector to a threat management facility for the customer premises; receiving configuration information for the connector from the threat management facility, the configuration information identifying an application on the customer premises to offer as a zero trust network access service; coupling the connector to a cloud-based data plane for the zero trust network access service; coupling the connector to the application on the customer premises; and managing zero trust network access to the application by a user through the cloud-based data plane by authenticating the user for the application with an authentication component configured through the threat management facility and executing in the cloud-based data plane.

Implementations may include one or more of the following features. The authentication component may include an Open Authorization 2.0 proxy. The method may include managing zero trust network access to the application by authorizing the user according with an authorization component configured through the threat management facility and executing in the cloud-based data plane. The authorization component may include an Open Policy Agent. The cloud-based data plane may execute on a cloud platform remote from the customer premises. The threat management facility may execute on a cloud platform remote from the customer premises. Coupling the connector to the cloud-based data plane may include coupling the connector through a secure tunnel to a cloud platform for the cloud-based data plane using one or more secure tunnel components of the cloud platform. The method may include storing tunnel components, authentication components, and authorization components for the cloud-based data plane on a cloud platform remote from the customer premises.

In order to efficiently manage a secure tunnel between a zero trust network access (ZTNA) connector (on the customer premises hosting a ZTNA application) and a cloud-based ZTNA data plane, tunnel components such as a WebSocket server can be run on the cloud platform that is hosting the data plane. As a significant advantage, this can simplify customer ZTNA deployments by permitting a reduction in the size and complexity of the ZTNA connector that is deployed to the customer premises.

In one aspect, a system disclosed herein may include: an application hosted on a customer premises; a threat management facility for the customer premises, the threat management facility remote hosted from the customer premises on a cloud resource; a data plane for zero trust network access, where the data plane is deployed in a cloud platform external to the customer premises and the threat management facility; a tunnel component in the data plane, the tunnel component configured by the threat management facility to manage secure tunnels between the data plane and the customer premises; and a connector. The connector: may be deployed on the customer premises; may be configured remotely from the threat management facility; may be configured to communicate with the data plane through a secure tunnel created using the tunnel component of the data plane; and may be configured to provide zero trust network access to the application for an external user through the data plane.

Implementations may include one or more of the following features. The tunnel component may include a WebSocket server. The system may include a policy manager executing on the WebSocket server and authorizing application traffic using open policy agent. The tunnel component may convert traffic in the data plane to TCP traffic for communication with the connector. The connector may execute on a firewall for the customer premises.

In one aspect, a computer program product disclosed herein may include computer executable code embodied in non-transitory computer readable media that, when executing on one or more computing devices, performs the steps of: providing a data plane for zero trust network access, where the data plane is deployed in a cloud platform external to a customer premises, and where the data plane includes a tunnel component executing in the data plane, the tunnel component configured to manage secure tunnels between the data plane and the customer premises; and providing a connector. The connector may be deployed on the customer premises, the customer premises may host an application, the connector may be configured remotely from a threat management facility for the customer premises, the connector may be configured to communicate with the data plane through a secure tunnel created using the tunnel component of the data plane, and the connector may be configured to provide zero trust network access to the application for an external user through the data plane.

Implementations may include one or more of the following features. The threat management facility may execute on a second cloud platform external to the customer premises and external to the cloud platform hosting the data plane. The tunnel component may include a WebSocket server. The computer program product may include code that provides a policy manager executing on the WebSocket server and authorizing application traffic using open policy agent. The tunnel component may convert traffic in the data plane to TCP traffic for communication with the connector. The connector may execute on a firewall for the customer premises.

In one aspect, a method disclosed herein may include: hosting a data plane for zero trust network access on a cloud platform external to a customer premises, the data plane including a secure tunnel component; and executing a connector on a network component of the customer premises. The customer premises may host an application, the connector may be configured remotely from a threat management facility coupled to the customer premises, the connector may be coupled to the data plane through a secure tunnel created using the secure tunnel component, and the connector may be configured to provide zero trust network access to the application for an external user through the data plane.

Implementations may include one or more of the following features. The network component may include a firewall for the customer premises. The connector may be configurable by the threat management facility to provide zero trust network access through either (a) the secure tunnel and the data plane or (b) a direct user connection to the firewall on the customer premises. The network component may include a gateway for an enterprise network of the customer premises. The threat management facility may execute on a second cloud platform external to the customer premises and external to the cloud platform hosting the data plane. The secure tunnel component may include a WebSocket server. The secure tunnel component may convert traffic in the data plane to TCP traffic for communication with the connector through the secure tunnel. The method may include authorizing application traffic with a policy manager executing in the data plane. Authorizing application traffic may include authorizing application traffic using open policy agent.

In a cloud-based data plane for a zero trust network access system, a service proxy manages incoming user requests for access to ZTNA applications. A load balancer may be configured to retrieve connection information from the data plane such as connection counts, tunnel distributions, and so forth, and to use this information to provide load balancing information to the service proxy, so that the service proxy can specify a route to the customer premises through the data plane. Secure tunnels to a customer premises can also be scaled according to traffic using tunnel information available within the data plane. In one aspect, tunnels can be scaled up by checking for connections and only adding a new tunnel when existing tunnels are full. In another aspect, tunnels can be scaled down by removing existing connections as they are taken down by users, and timing out connections that exceed a timeout window.

In one aspect, a system disclosed herein may include a data plane for zero trust network access to an application, where: the application is hosted on a customer premises, the data plane is deployed in a cloud-based platform external to the customer premises, the data plane includes a plurality of connection servers configured to connect to the customer premises, and the data plane includes a service proxy configured to handle an incoming request from a user for the application. The system may further include a load balancer configured to retrieve connection information for the data plane, and to provide load balancing information to the service proxy specifying one of the plurality of connection servers to connect the user to the customer premises for use of the application.

Implementations may include one or more of the following features. The plurality of connection servers may include WebSocket servers. The service proxy may include an Envoy proxy. The system may include a plurality of service proxies configured to receive load balancing information from the load balancer. The connection information may include a connection count for each of a number of secure tunnels from the plurality of connection servers to the customer premises. The connection information may include load balancing based on connection counts for each of a number of tunnels between the plurality of connection servers and the customer premises. The load balancing information may specify a route for connecting the user to the application through the data plane. The data plane may include an authorization component configured to provide zero trust network access authorization to a user requesting access to the application through the data plane. The data plane may include an authentication component configured to provide user authentication to a user requesting access to the application through the data plane. The system may include a tunnel scaling module configured to: in response to a new connection request, add a new tunnel between the data plane and the customer premises when each of a number of tunnels between the data plane and the customer premises meets a predetermined threshold for a number of user connections, and, in response to the new connection request, add a new connection to one of the number of tunnels when the one of the number of tunnels does not meet the predetermined threshold. The tunnel scaling module may be further configured to take down one of the number of tunnels between the data plane and the customer premises in response to a second one of the number of tunnels meeting a predetermined criterion. The predetermined criterion for taking down the second one of the tunnels may include each of the connections associated with the tunnel meeting a timeout threshold. The predetermined criterion for taking down the second one of the tunnels may include a minimum threshold for the number of connections for the second one of the tunnels. The tunnel scaling module may be further configured to migrate one or more remaining connections in the second one of the tunnels to one or more other ones of the number of tunnels.

In one aspect, a computer program product disclosed herein may include computer executable code embodied in non-transitory computer readable media that, when executing on one or more computing devices, performs the steps of: providing a cloud-based data plane for zero trust network access to an application hosted on a customer premises; connecting to the customer premises with a plurality of connection servers in the cloud-based data plane, each connection server configured to connect to the customer premises for zero trust network access to the application; handling incoming requests for the application at the cloud-based data plane with a service proxy; and load balancing access to the application in the cloud-based data plane by retrieving connection information for the cloud-based data plane and providing load balancing information to the service proxy specifying one of the plurality of connection servers to connect a user to the customer premises for use of the application.

In one aspect, a computer-implemented method disclosed herein may include: providing a cloud-based data plane for zero trust network access to an application hosted on a customer premises; executing a plurality of connection servers in the cloud-based data plane, each connection server configured to connect to the customer premises for zero trust network access to the application; executing a service proxy in the cloud-based data plane, the service proxy configured to handle an incoming request from a user for the application; and executing a load balancing module in the cloud-based data plane, the load balancing module configured to retrieve connection information for the cloud-based data plane and to provide load balancing information to the service proxy specifying one of the plurality of connection servers to connect the user to the customer premises for use of the application.

Implementations may include one or more of the following features. The connection information may include a connection count for each of a number of secure tunnels from the plurality of connection servers to the customer premises. The connection information may include load balancing information based on connection counts for each of a number of tunnels between the plurality of connection servers and the customer premises. The tunnel scaling module may be configured to: in response to a new connection request, add a new tunnel between the cloud-based data plane and the customer premises when each of a number of tunnels between the cloud-based data plane and the customer premises meets a predetermined threshold for a number of user connections, and, in response to the new connection request, add a new connection to one of the number of tunnels when the one of the number of tunnels does not meet the predetermined threshold. The tunnel scaling module may be further configured to take down one of the number of tunnels between the cloud-based data plane and the customer premises in response to a second one of the number of tunnels meeting a predetermined criterion.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
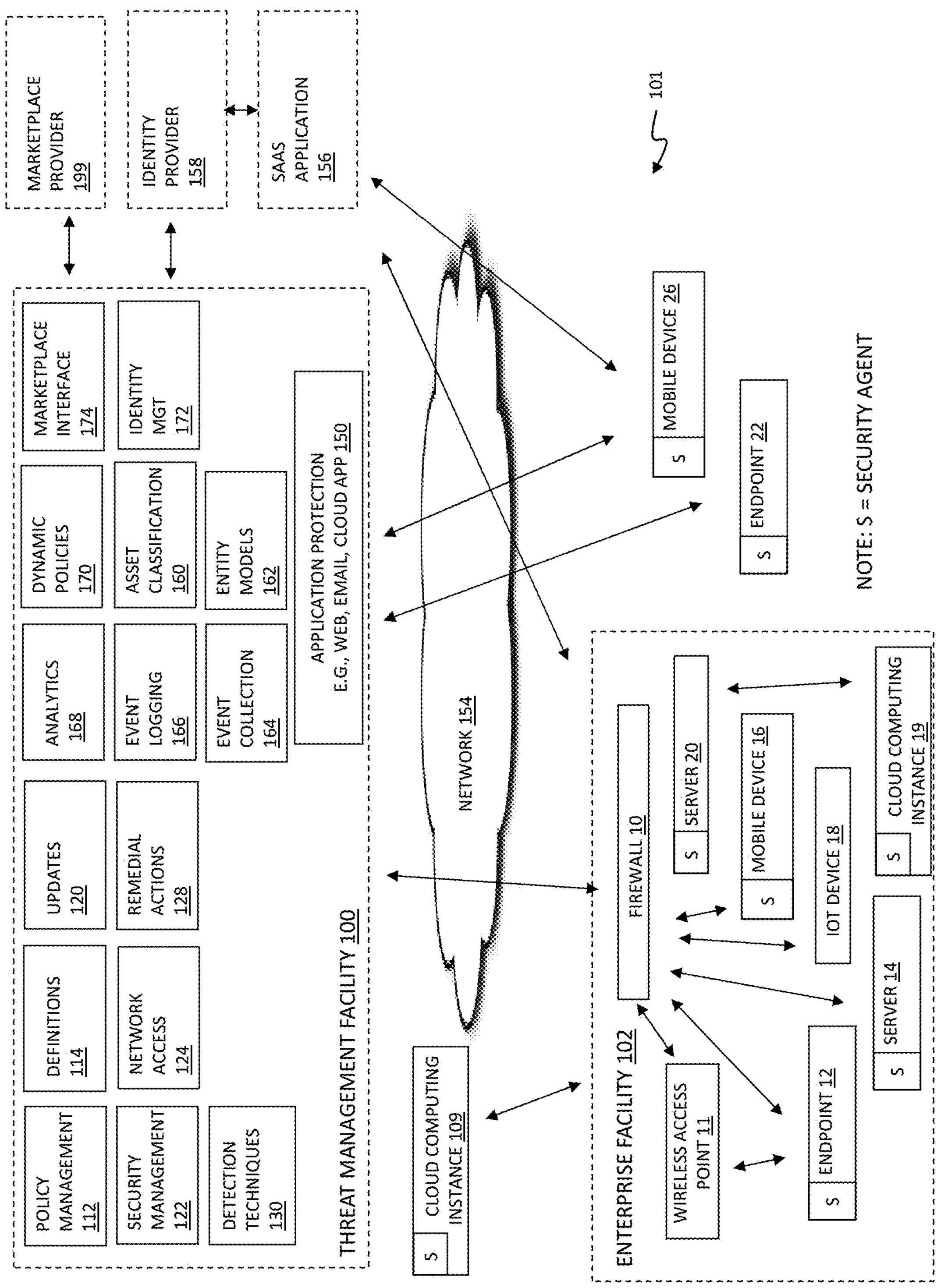
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications, and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policy facility 170, identity management facility 172, and marketplace interface facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, the threat management facility 100 may include, or may be connected to a security agent S such as a local security agent deployed on one or more other entities within the threat management system 101. The facilities of the threat management facility 100, and/or a security agent S therefor, may be deployed on the same physical hardware or logical resource as a gateway for an enterprise facility 102, a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of an application protection facility 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of the application protection facility 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of the application protection facility 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of the application protection facility 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of the application protection facility 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of the application protection facility 150 provided by the cloud, and so on. In embodiments, some reputation information may be stored on a compute instance 10-26, and other reputation data available through cloud lookups to an application protection lookup database, such as may be provided by the application protection facility 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 90 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a blacklist, an allowed list, a whitelist, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, a part of the enterprise facility 102 network, a part of the threat management facility 100, or any suitable combination of these.

The policy management facility 112 may include dynamic policies that use contextual or other information to make security decisions. As described herein, the dynamic policy facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 9, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of the application protection facility 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 92 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 92 and policy management facility 112 may push information to the enterprise facility 102 network and/or the compute instances 10-26, the enterprise facility 102 network and/or compute instances 10-26 may pull information from the security facility 92 and policy management facility 112, or there may be a combination of pushing and pulling of information. For example, the enterprise facility 102 network and/or compute instances 10-26 may pull update information from the security facility 92 and policy management facility 112 via the update facility 120, an update request may be based on a time period, by a certain time, by a date, on demand, or the like. In another example, the security facility 92 and policy management facility 112 may push the information to the enterprise facility's 102 network and/or compute instances 10-26 by providing notification that there are updates available for download and/or transmitting the information. In an embodiment, the policy management facility 112 and the security facility 92 may work in concert with the update management facility 90 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definitions facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 94 may restrict access to certain applications, networks, files, printers, servers, databases, and so on. In addition, the network access facility 94 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 94 may determine if a given compute instance 10-22 should be granted access to a requested network location, e.g., inside or outside of the enterprise facility 102. Network access facility 94 may determine if a compute instance 22, 26 such as a device outside the enterprise facility 102 may access the enterprise facility 102. For example, in some cases, the policies may require that when certain policy violations are detected, certain network access is denied. The network access facility 94 may communicate remedial actions that are necessary or helpful to bring a device back into compliance with policy as described below with respect to the remedial action facility 128. Aspects of the network access facility 94 may be provided, for example, in the security agent of the endpoint 12, in a wireless access point 11, in a firewall 10, as part of the application protection facility 150 provided by the cloud, and so on.

In an embodiment, the network access facility 94 may have access to policies that include one or more of a block list, an allowed list, an unacceptable network site database, an acceptable network site database, a network site reputation database, or the like of network access locations that may or may not be accessed by the client facility. Additionally, the network access facility 94 may use rule evaluation to parse network access requests and apply policies. The network access rule facility 94 may have a generic set of policies for all compute instances, such as denying access to certain types of websites, controlling instant messenger accesses, or the like. Rule evaluation may include regular expression rule evaluation, or other rule evaluation method (s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models stored in an entity model facility 162. The entity models may be used, for example, to determine the events that are generated by assets. For example, some operating systems may provide useful information for detecting or identifying events. For examples, operating systems may provide process and usage information that can be accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility. Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 92 may take any steps or deploy any measures suitable for addressing a detection of a threat, potential threat, policy violation or other event, code or activity that might compromise security of a computing instance 10-26 or the enterprise facility 102.

Figure 2:
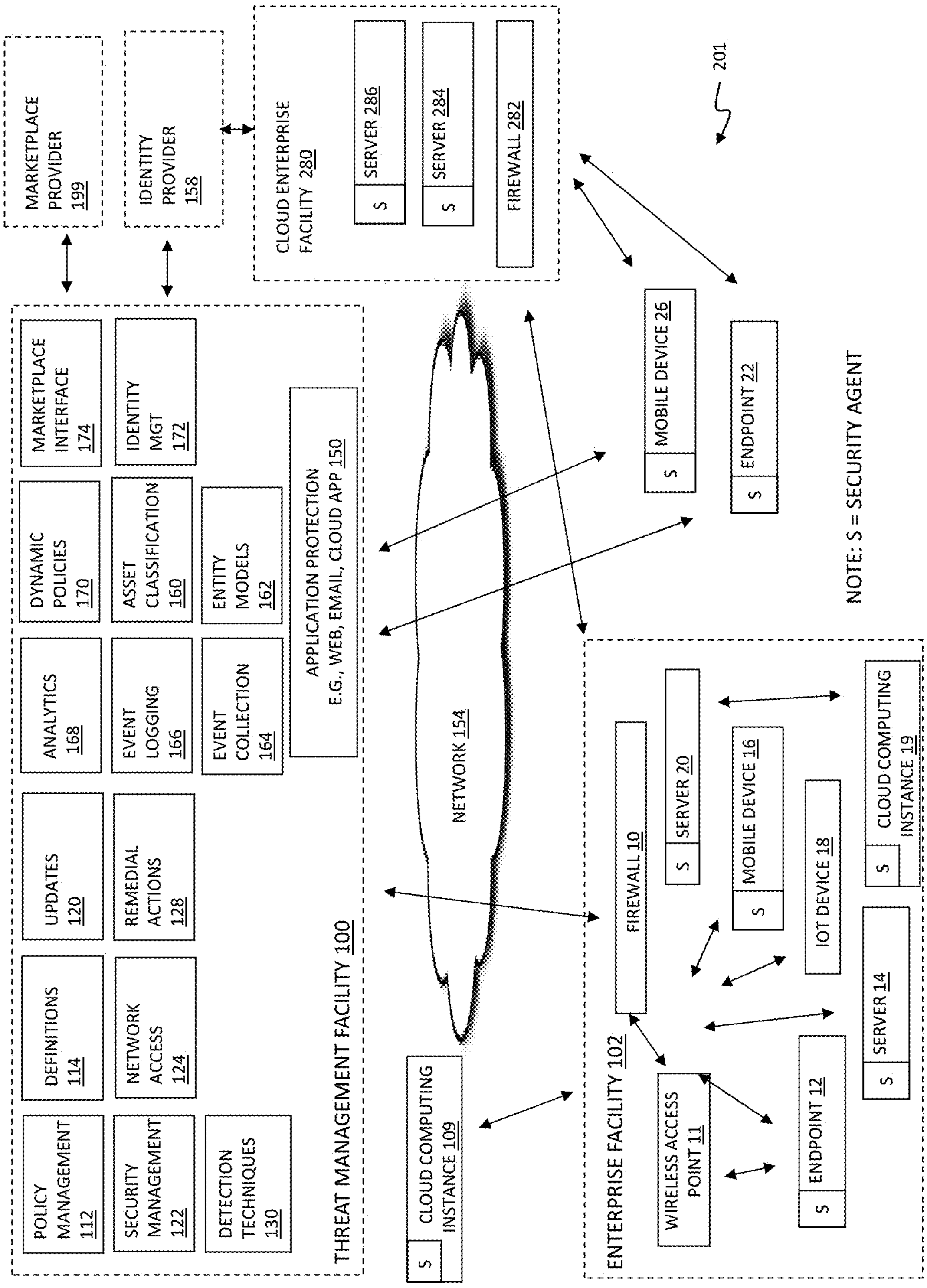
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
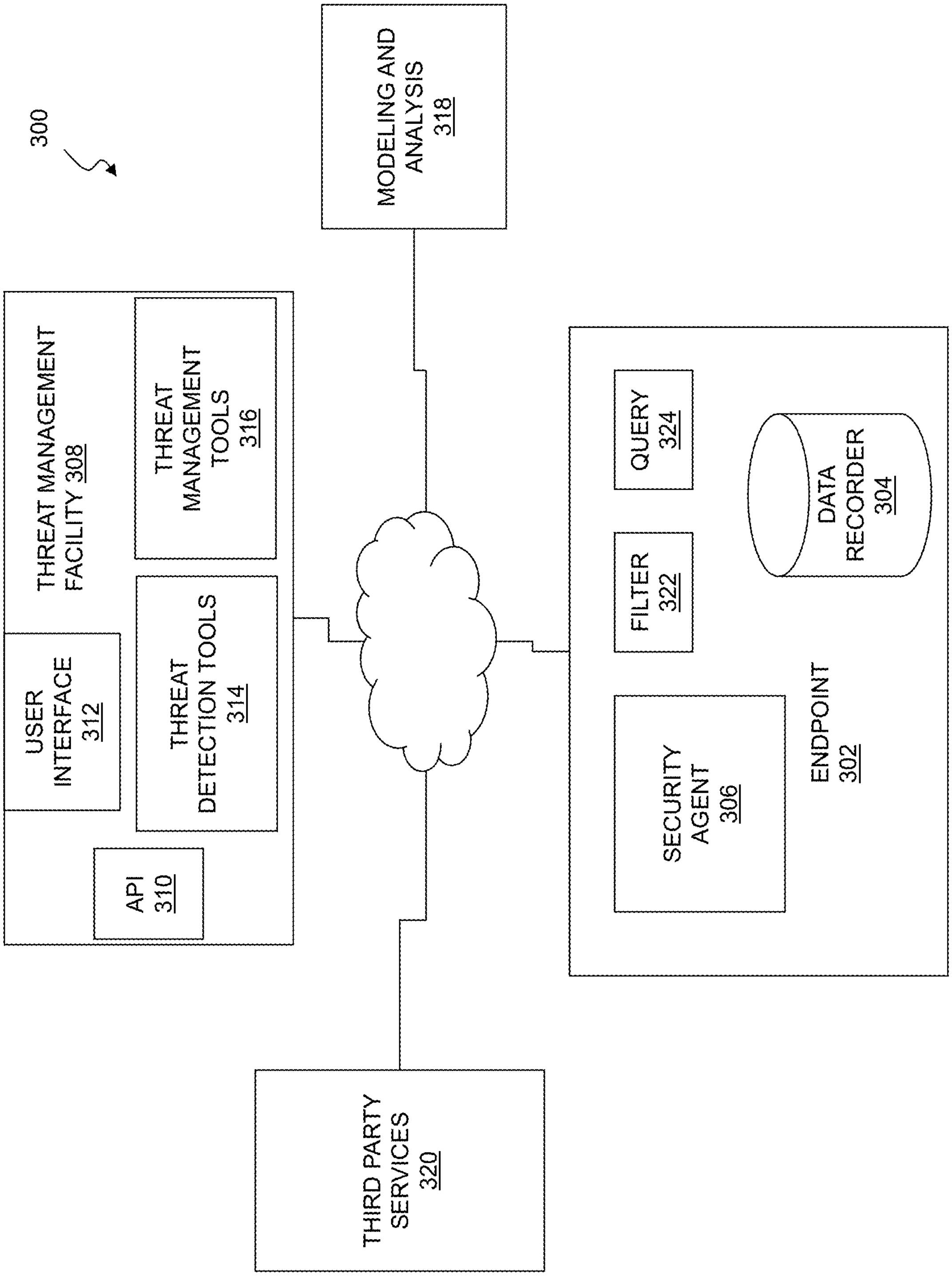
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g., models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus, for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be requested for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
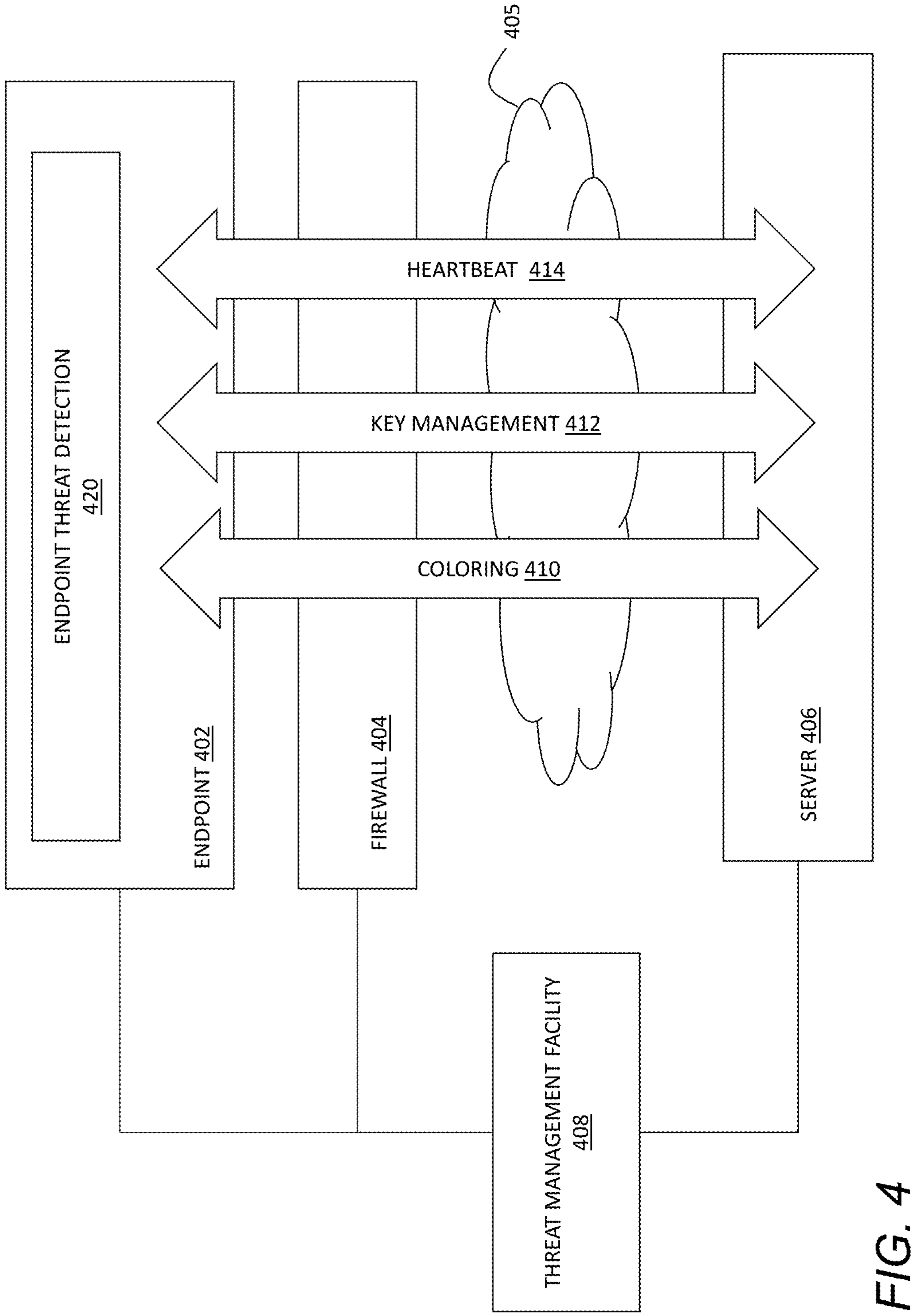
FIG. 4 illustrates a threat management system.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 402 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

Figure 5:
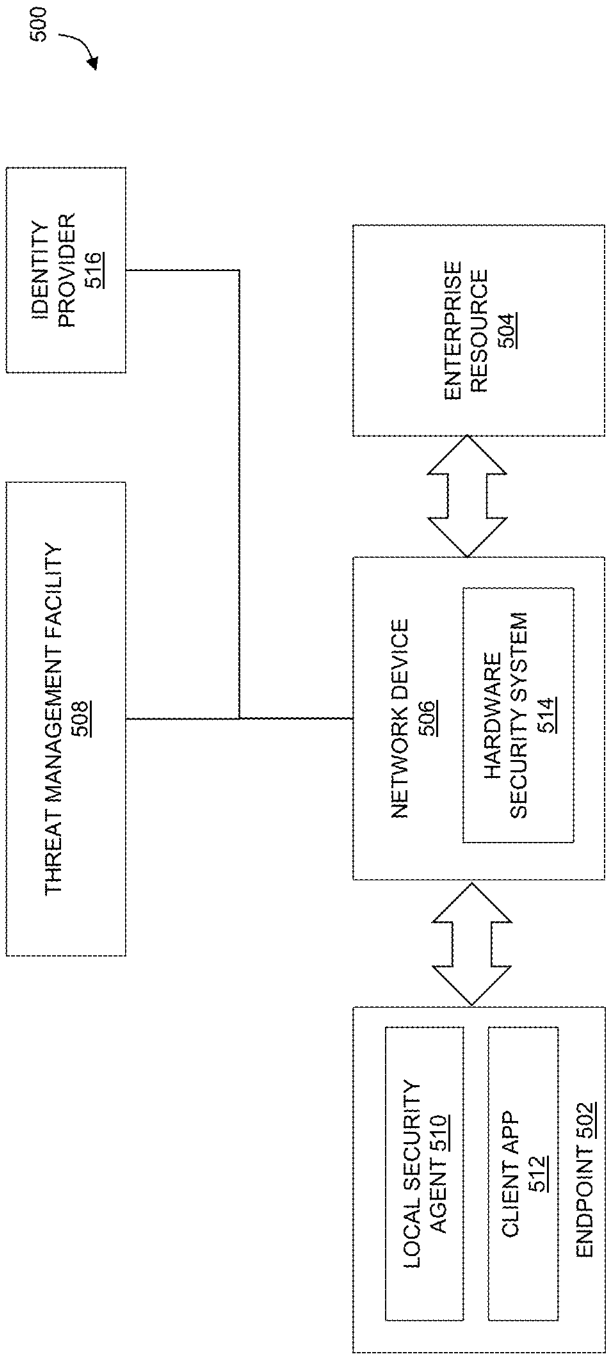
FIG. 5 shows a threat management facility in a zero trust network access (ZTNA) environment.

FIG. 5 shows an enterprise network. In the enterprise network 500, an endpoint 502 may access an enterprise resource 504 through a network device 506, with security for the enterprise network managed by a threat management facility 508. In general, the enterprise network 500, the endpoint 402, the enterprise resource 504, the network device 506, and the threat management facility 508 may be any of those described herein.

The endpoint 502 may include any of the endpoints, endpoint devices, compute instances, or other physical or virtual computing devices described herein. In one aspect, a user of the endpoint 502 may request or seek to use the enterprise resource 504. The endpoint 502 may execute a local security agent 510, also as described herein, that locally manages security of the endpoint 502 in cooperation with the threat management facility 508. The endpoint 502 may also execute any suitable client application 512, for example a local application such as a web browser or other application that accesses (or requests access to) the enterprise resource 504 through the network device 506.

The enterprise resource 504 may generally include any application, database, data store, file server, web server, mail server, or other resource supported by an enterprise, including an application or the like locally hosted on customer premises, one or more remote resources, or any combination of these. In one aspect, the enterprise resource may include a protected resource such as an application secured by password access, and/or a zero trust network access resource accessible through a zero trust network access gateway for the enterprise network.

The network device 506 may include any network device such as a firewall, switch, wireless access point, gateway, and so forth. In general, services operating on the network device 506 may support network connectivity among other devices (including access to the enterprise resource 504), and may support enterprise threat management through a connection to the threat management facility 508 and the local security agent 510 executing on the endpoint 502. The network device 506 may advantageously incorporate a hardware security system 514 such as a dedicated chip or circuit that stores data for authenticating the network device 506 to other devices, or otherwise securing operation of the network device 506 or verifiably asserting an identity of the network device 506. For example, Trusted Platform Module (TPM) is an international standard for a dedicated hardware cryptoprocessor that specifies an architecture, security algorithms, cryptographic primitives, root keys, authorization standards, and so forth that can be used for authentication. A TPM cryptoprocessor securely stores device-specific key material that is bound to a device at manufacture. The cryptoprocessor may also supports various cryptographic functions (e.g., encryption, decryption, hashing, key generation, random number generation, etc.) for remote attestation, so that the cryptoprocessor can reliably authenticate the device to other entities on demand. In the context of a secure enterprise network, the hardware security system 514 permits the network device 506 to authenticate to the threat management facility 508 automatically or semi-automatically when the network device 506 is physically connected to a customer's enterprise network. While the Trusted Platform Module standard provides a useful and highly secure, hardware-based security system, any other standardized, proprietary, and/or commercial hardware-based security system may also or instead be used as the hardware security system 514, provided the system offers suitable security, and, where applicable, provided the system supports remote authentication of the network device 506, e.g., from the threat management facility 508. For example, Platform Trust Technology from Intel™ and PSP fTPM from AMD™ provide similar functions and security to the TPM standard, and may be used to provide a hardware security system 514 as contemplated herein.

In one aspect, the network device 506 may include a zero trust network access (ZTNA) gateway that provides secure connectivity for user devices, such as the endpoint 502, to a protected resource such as the enterprise resource 504. The zero trust network access gateway, may, for example, support client access via a WebSocket service, and/or agentless access using a reverse proxy. The zero trust network access gateway may facilitate establishing and maintaining a connection with a local security agent 510 deployed on the endpoint 502 and adapted for operation in a ZTNA environment. In general, the zero trust network access gateway may require authentication of endpoints 502 on a resource-by-resource basis. To this end, the enterprise network 500 may include an identity provider 516 that supports, e.g., secure, credential-based authentication of entities within the enterprise network 500.

The threat management facility 508 may include any of the threat management facilities or other security resources described herein. The threat management facility 508 may generally support security of the enterprise network 500, including a range of administrative services such as configuring gateways, managing protected resources, configuring the identity provider 516, monitoring ZTNA appliances, creating notifications, generating reports, managing users, and the like. In one aspect, the threat management facility 508 may support security by detecting new network hardware such as the network device 506 when it is added to the enterprise network 500, and by authenticating the new network hardware, such as the network device 506, before permitting network traffic through the network device 506.

In one aspect, the network device 506 may itself be an endpoint 502 that is managed by the threat management facility 508. It should also be noted that an endpoint 502 other than a network device, such as a client device or other end user device, may also include a hardware security system 514 that can be used to authenticate an end user or an end user device to the threat management facility 508 (e.g., for delivery of security services or for entry into a managed enterprise network), or to authenticate to a ZTNA gateway or the enterprise resource 504 (e.g., for zero trust network access to the enterprise resource 504 by a user of the device). Thus, notwithstanding specific embodiments described herein, the hardware security system 514 may generally be used to authenticate new hardware securely and reliably when it is added to the enterprise network 500, or to authenticate a device or device user when requesting access to network resources, or any combination of these.

In one aspect, the local security agent 510 may provide a secure heartbeat, such as any of the secure heartbeats described herein. In the context of network access, the secure heartbeat may be used to assert an identity of a device, a device user, or a security posture of the endpoint 502 in order to facilitate access to the enterprise resource 504, security services of the threat management facility 508, or other network resources associated with the enterprise network 500.

Figure 6:
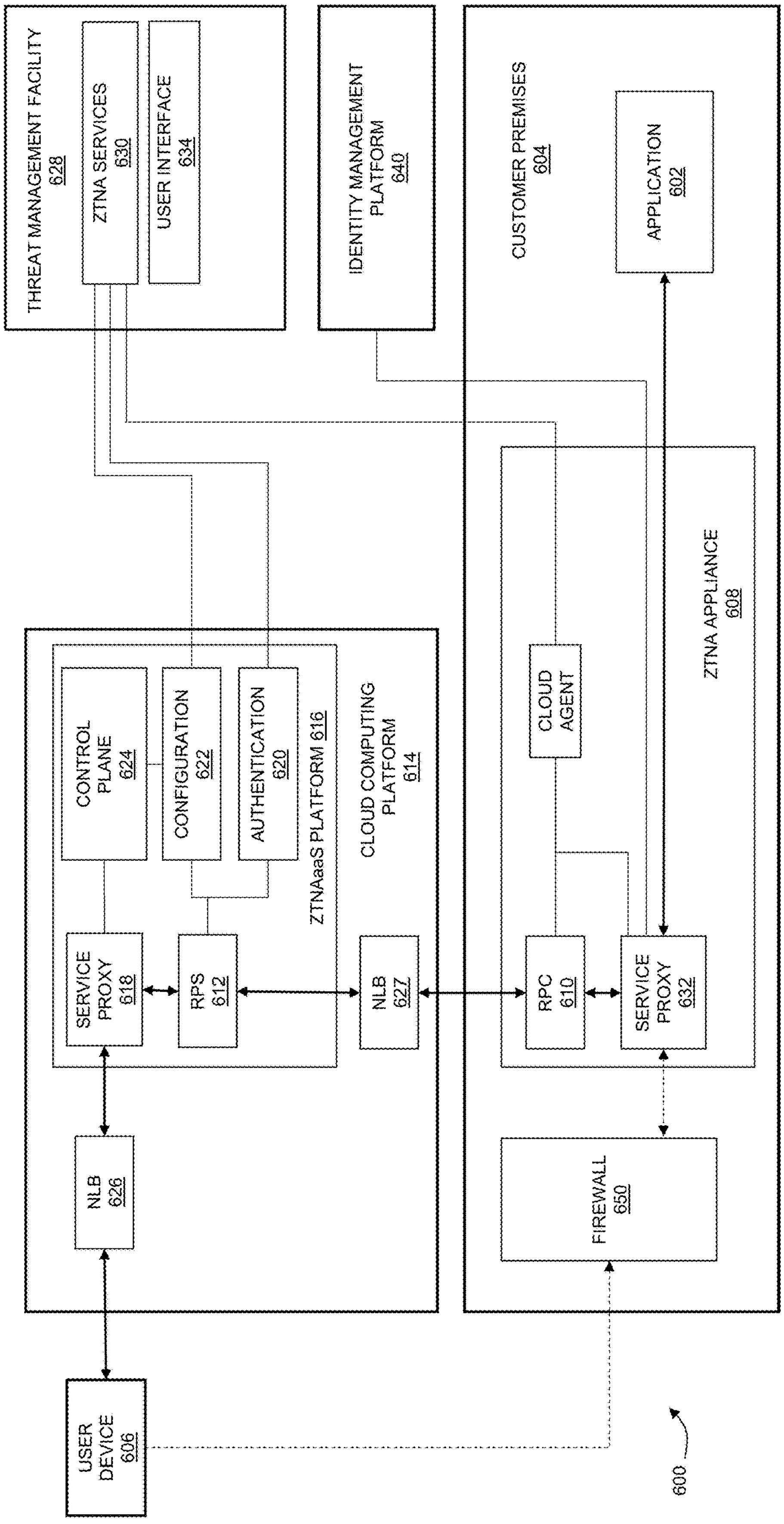
FIG. 6 shows a zero trust network access environment using a zero trust network access appliance.

FIG. 6 shows a zero trust network access environment using a zero trust network access (ZTNA) appliance. In general, a portion of the infrastructure for zero trust network to an application may be deployed as a cloud-based service remotely from the customer premises where an application is hosted. By connecting this cloud-based infrastructure to a ZTNA appliance on the customer premises through a secure tunnel or the like, the application hosted behind the ZTNA appliance on the customer premises can then be accessed externally as a ZTNA application via the cloud-based service without the customer premises opening a firewall to public networks or otherwise exposing potential attack surfaces to the customer premises.

In general, a system 600 supporting the zero trust network access environment may include an application 602 hosted on a customer premises 604, along with a ZTNA appliance 608 hosted on the customer premises 604. The system 600 may include any of the ZTNA gateways, ZTNA applications, endpoints, and threat management facilities described herein, as well as any of the subcomponents or modules thereof. The ZTNA appliance 608 may be configured to provide zero trust network access to the application 602.

In the system 600, a cloud computing platform 614 hosted remotely from the customer premises 604 may be configured to provide a point of access to a device such as the user device 606 operated by a user who is associated with the customer premises 604. To this end, the cloud computing platform 614 may host a zero trust network as a service (ZTNAaaS) platform 616 managed by the threat management facility 628 and configured to provide a network access point for ZTNA applications remotely hosted on the customer premises 604. The ZTNAaaS platform 616 may, for example, includes a reverse proxy server 612 for securely connecting to the customer premises 604 and a service proxy 618 providing a network access point. The ZTNAaaS platform 616 may also include an authentication server 620, a configuration service 622, and control plane services 624. The cloud computing platform 614 hosting the ZTNAaaS platform 616 may also include other services and resources, such as an interface to external Domain name system resources, domain hosting resources, data caches (e.g., for customer configuration information), cloud computing resources (e.g., for managing compute instances, monitoring the ZTNAaaS platform 616, and so forth), and network resources. For example, the cloud computing platform 614 may include a number of network load balancers such as a first network load balancer 626 and a second network load balancer 627 that distribute traffic (with the user device 606 and/or the customer premises 604) across multiple targets, such as different compute instances hosted on the cloud computing platform 614.

A threat management facility 628, such as any of the threat management facilities described herein, may host a number of ZTNA services 630 for configuring and managing resources of the ZTNAaaS platform 616, thus providing a control plane for zero trust network access to the application 602 hosted on the customer premises 604. The ZTNA services 630 may be deployed, e.g., using any suitable microservices architecture or other environment suitable for scalable deployment or the like. In one aspect, the ZTNA services 630 may store configuration information such as application information, gateway information, security and use policies, identity and access management information (including identity providers, if/as appropriate), and so forth. The ZTNA services 630 may also or instead support many of the functions described herein, such as creating alias fully qualified domain names for connectors and agent-less applications, validating domain ownership, and so forth. The threat management facility 628 may be hosted remotely from the cloud computing platform 614 and/or customer premises 604, and may be coupled in a secure communicating relationship with the cloud computing platform 614 and/or customer premises 604. In general, the threat management facility 628 may provide security services for the customer premises 604 (and external enterprise users) as described herein. The threat management facility 628 may also provide a user interface 634, such as an administrative interface for administrative configuration of the ZTNA appliance 608, or more generally for use in configuring the ZTNA environment as further described herein. The user interface 634 may also support management of any of the other security and ZTNA services described herein.

The cloud computing platform 614 may generally provide a configurable data plane for managing ZTNA connections from a user device 606 to the application 602. To provide a network-facing access point, the service proxy 618 on the ZTNAaaS platform 616 may generally be configured to couple the user device 606 to the application 602 hosted on the customer premises 604, e.g., by directing an incoming request from the user device 606 via the reverse proxy server 612 to a secure tunnel coupled to the reverse proxy client 610 at the customer premises 604, where a second service proxy 632 on the ZTNA appliance 608 can authenticate a user at the user device 606 for access to the application 602 using any suitable authentication protocols, authentication factors, procedures, credentials, and so forth. In one aspect, a secure heartbeat from the user device 606, such as any of the heartbeats described herein, may be used as an authentication factor for authenticating to the ZTNA appliance 608, or otherwise asserting an identity of the user or security posture of the user device 606 to support the use of secure services, connections, and so forth.

In one aspect, the cloud computing platform 614 provides a data plane for zero trust network access to the application 602 hosted on the customer premises 604. To this end, the cloud computing platform 614 may support an addressable access point at the service proxy 618, which is connected by a data path through the reverse proxy server 612 to the reverse proxy client 610 on the customer premises 604, and from there to the application 602. In one aspect, the administrative interface of the threat management facility 628 may be configured to receive a Domain name system record identifying an address for the cloud computing platform 614, e.g., for accessing an associated application 602. Based on address information provided through the administrative interface, or where appropriate, information that is automatically generated, the cloud computing platform 614 may then provide a network address available from a public network for zero trust network access to the application 602. The cloud computing platform 614 may also or instead provide a fully qualified domain name for zero trust network access to the application.

Returning to the customer premises 604, the ZTNA appliance 608 may generally be configured, e.g., by a service proxy 632 managed by the ZTNA services 630, to support ZTNA access to the application 602. In this capacity, the ZTNA appliance 608 may authenticate users who request access to the application 602 from the user device 606. Users may be authenticated using any suitable authentication techniques or protocols. For example, the ZTNA appliance 608 may authenticate users for access to the application 602 with a username and password, such as a username and password managed by the customer premises 604 or an identity management platform 640 such as a third party identity management platform external to the customer premises 604, or an identity management platform hosted by the threat management facility 628 (which may also be a third party relative to the customer). In one aspect, the ZTNA appliance 608 may be configured to authenticate the user with two or more authentication factors including, by way of non-limiting examples, a biometric authentication factor, a hardware token authentication factor, an identifier such as an electronic mail or instant messaging address, a heartbeat from the user device 606 (e.g., a heartbeat from a security agent executing on the user device 606), or any other authentication factor associated with a user that the user can employ to assert identity to the ZTNA appliance 608. The authentication factors and supporting credentials may in general be managed by the customer premises 604, the threat management facility 628, the identity management platform 640, or any combination of these.

In order to securely couple the customer premises 604 to the cloud computing platform 614 for ZTNA delivery of the application 602, the ZTNA appliance 608 may include a reverse proxy client 610, and may be configured to initiate a secure connection to a reverse proxy server 612 on the cloud computing platform 614 in order to operatively couple the application 602 hosted on the customer premises 604 through the cloud computing platform 614 to the user device 606 operated by the user. In general, the reverse proxy server 612 and the reverse proxy client 610 may be any client-server modules suitable for establishing a secure tunnel between the ZTNA appliance 608 on the customer premises 604 and the cloud computing platform 614 where a front end of the ZTNA data plane is hosted. For example, the reverse proxy server 612 and reverse proxy client may be a Fast Reverse Proxy Server and Fast Reverse Proxy Client based on an open source project for exposing a local resource behind a firewall or Network Address Translation device to the Internet by port forwarding, or any other server/client architecture for securely connecting resources across a public data network.

In operation, the reverse proxy client 610 may initiate outbound TLS connections or the like to the reverse proxy server 612, and then the reverse proxy server 612 can allocate a free port dynamically where the reverse proxy server 612 can listen for new connections from the ZTNA appliance 608. In one aspect, the reverse proxy server 612 can be configured to authenticate connections from the reverse proxy client 610, e.g., using the authentication server 620 of the ZTNAaaS platform 616. For example, when the reverse proxy client 610 makes an initial connection to the reverse proxy server 612, the reverse proxy server 612 may take a token supplied by the reverse proxy client 610, and request that the authentication server 620 validate the token. This may include a token from the threat management facility 628, a token from the identity management platform 640, a token from a hardware security system on the ZTNA appliance 608, or any other token or other secure, identifying information for verifiably asserting the identity of the ZTNA appliance 608, or a user of the ZTNA appliance 608, to the ZTNAaaS platform 616. The reverse proxy client 610 may also provide additional details, such as gateway details for the application 602, so that this information can be used to configure the ZTNAaaS platform 616. If the authentication token is validated by the authentication server 620, then a secure tunnel may be established. Otherwise, the connection may be terminated.

When a new connection is created, the reverse proxy server 612 may request configuration information from the configuration service 622, which can store Internet Protocol (IP) address information, port details, and other information for the reverse proxy server 612 and the ZTNA appliance 608 (including, e.g., a name of the application 602 being supported by the connection), and provide an OK response (HTTP 200) to the reverse proxy server 612 upon proper configuration. The service proxy 618 may then be configured through the control plane service 624, e.g., with data from the configuration service 622, to respond to requests for the application 602 received from a device such as the user device 606. In response to the OK response from the configuration service 622, the reverse proxy server 612 may initiate listening for new connections to the application 602 on a port for the service proxy 618 in the ZTNAaaS platform 616. If no OK response is received from the configuration service 622, the connection to the reverse proxy client 610 may be terminated.

In general, the configuration service 622 may manage configuration information for the ZTNAaaS platform 616, e.g., by synchronizing data on the ZTNAaaS platform 616 as customers or administrators make changes at the threat management facility 628, and by notifying the control plane service 624 of changes. The configuration service 622 may monitor the ZTNA services 630 for configuration changes, e.g., by subscribing to an Amazon™ SNS Topic in an AWS environment, or otherwise subscribing to a communication channel, listening for corresponding events, or otherwise communicating with the ZTNA services 630 to receive updates to configuration information. The configuration service 622 may, for example, be configured as a server plugin for the reverse proxy server 612 so that the reverse proxy server 612 issues a request to the configuration service 622 when a reverse proxy client 610 makes a connection. As a part of this request, the reverse proxy server 612 may provide information to the configuration service 622 about the connection to the reverse proxy client 610 such as the Internet Protocol address, port, gateway identifier, and tenant (e.g., customer) identifier. Using these details, the configuration service 622 may fetch information for the connection and cache the data in a suitable data store on the cloud computing platform 614. For example, the configuration service 622 may fetch tenant (or customer) information, gateway information, information for applications configured for the gateway, customer uploaded certificates, heartbeat certificates, endpoint certificate and/or fingerprint lists, domain ownership details, and so forth.

The application 602 may be any application hosted on the customer premises 604 or any of the other enterprise resources described herein including without limitation databases, data management software, media players, connectivity applications or browsers, security programs, office productivity tools, games, or other general or business-specific applications. The application 602 may, for example, be an agentless application, e.g., an application that does not require services or processes running in the background on a user device 606, and that typically requires an account for access to data and other local resources. The application 602 may also or instead include an agent-based application. For agentless applications, the service proxy 618 may differentiate customers using domain names for gateways and applications (where the same domain name cannot be used by two different customers). In this case, Mutual Transport Layer Security (mTLS) authentication, or any other suitably secure authentication, may be performed by the service proxy 618. For agent-based applications, the service proxy 618 may be provided with customer certificates, which can be sent to a user's browser/agent for use, along with other certifying material such as a heartbeat, a fingerprint, user credentials, certificates and the like, as appropriate, in connecting to the service proxy 618, which may be configured with corresponding routes to forward associated requests to tunnels that have been established for specific services/applications.

The user device 606 may generally include any of the endpoints or other compute instances or computing devices described herein. In one aspect, the user device 606 may include a local security agent, such as any of the local security agents described herein, configured to locally manage security of the user device 606, connect to the threat management facility for remote management of device security, generate a heartbeat indicating a security state or other information about the user device 606, and so forth.

The service proxies, such as the service proxy 618 for the ZTNAaaS platform 616 or the service proxy 632 for the ZTNA appliance 608, may be any suitably configurable agents, modules, code segments, containers, computing objects, or the like. In a microservices architecture, a service proxy may more specifically operate as an intermediary between microservices application components, and provide a connection for clients to request various services. For example, Envoy is an open source edge and service proxy designed for use in cloud computing environments. Envoy provides a high performance distributed proxy for use in single services/applications, as well as large microservice architectures, and offers features such as APIs for dynamic configuration, a small memory footprint, load balancing, and good observability, that can make Envoy a good choice for use in the service proxies described herein. However, any other edge proxy or service proxy architecture, or other distributed computing framework suitable for scalable use and remote management in a cloud computing environment may also or instead be used to deploy and manage service proxies (and other resources) as described herein.

In one aspect, the ZTNA appliance 608 may be user-configurable to select between a gateway mode and a cloud mode. In the cloud mode, the ZTNA appliance 608 may be configured as a ZTNA connector that provides access to the application 602 through the cloud computing platform 614 as generally described herein. That is, the ZTNA appliance 608 may be configured to make an outbound connection to the reverse proxy server 612 of the cloud computing platform, authenticate to the reverse proxy server 612 with the authentication server 620, establish a secure tunnel between the ZTNA appliance 608 (at the customer premises 604) and the reverse proxy server 612 (at the cloud computing platform 614), and use the secure tunnel to provide zero trust network access to the application 602 hosted on the customer premises 604 by the user of the user device 606. In this mode, the ZTNA connector may authenticate a user that accesses the application 602 through the secure tunnel to the cloud computing platform 614, e.g., by using authentication services of the cloud computing platform 614, the identity management platform 640, the threat management facility 628, or any other source(s) of trusted authentication services for the customer premises 604.

A user-configurable ZTNA appliance 608 may also be configured or reconfigured, e.g., by a setting controlled through the user interface 634 of the threat management facility 628, to operate in a gateway mode. In this gateway mode, the ZTNA appliance 608 may be configured as a ZTNA gateway to provide access to the application 602 through a firewall 650 hosted on the customer premises 604, or connected between the customer premises 604 and an external data network. In this latter configuration, the gateway mode, the user device 606 would access the application 602 through the firewall 650 at the customer premises 604, and through the ZTNA appliance 608, which will operate as a ZTNA gateway to authenticate the user of the user device 606 for zero trust network access. Thus more generally, the ZTNA appliance 608 may be user-configurable by the customer (e.g., using the user interface 634 of the threat management facility 628) to operate as either (a) a zero trust network access gateway exposed to a public network through a firewall 650 for the customer premises 604, or (b) a zero trust network access connector coupled through a secure tunnel to a data plane hosted on the cloud computing platform 614, and accessible via a service proxy 618 exposed to the public network (or other network used by the user device 606). This approach advantageously permits a customer who is managing the customer premises 604 to select whether and when to use a firewall rather than a cloud-based data plane, and/or to deploy different applications using any combination of the foregoing. This also permits the customer to choose between access protocols, e.g., where the ZTNA gateway uses a Session Description Protocol (SDP) interface and the ZTNA connector uses a Software-as-a-Service (SaaS) interface.

According to the foregoing, a system for zero trust network access to a customer application, as described herein, may include an application hosted on a customer premises; a threat management facility configured to manage security for the customer premises; a cloud computing platform hosted remotely from the customer premises, the cloud computing platform configured to provide a point of access to a device operated by a user associated with the customer premises, and a zero trust network access appliance hosted on the customer premises. The cloud computing platform may include a service proxy configured to couple the device to the application hosted on the customer premises, a reverse proxy server connected to the service proxy, the reverse proxy server configured to securely connect to the customer premises, and an authentication server securely coupled to the threat management facility and configured to create a secure tunnel to the customer premises by authenticating a secure connection to the reverse proxy server. The zero trust network access appliance may be configured to initiate the secure connection to the reverse proxy server, and the zero trust network access appliance configured to operatively couple the application hosted on the customer premises through the cloud computing platform to the device operated by the user.

In another aspect, a system for zero trust network access to a customer application, as described herein, may include an application hosted on a customer premises; a cloud computing platform remote from the customer premises, the cloud computing platform providing a cloud-based data plane for zero trust network access to the application; a zero trust network access appliance hosted on the customer premises, the zero trust network access appliance locally coupled to the application and remotely coupled to the cloud computing platform; and a secure tunnel between the cloud computing platform and the zero trust network access appliance, the zero trust network access appliance configured to provide zero trust network access to the application from the cloud computing platform through the secure tunnel.

The system 600 may include a sandbox for testing components such as service proxies. As described herein, service proxies that provide an access point for applications through a data network may become increasingly complex as additional customers and applications are added. In order to ensure that a service proxy will function properly before deployment, a newly configured service proxy may advantageously be tested in a sandbox environment. In general, this may include any programming environment that simulates usage on the ZTNAaaS platform 616 and cloud computing platform 614 and permits testing and validation in that environment before the service proxy is deployed live. While the sandbox is depicted as residing on the threat management facility 628, it will be understood that the sandbox may also or instead execute on the cloud computing platform 614 or some other separate environment configured for isolated testing of cloud computing components.

It will be understood that, while FIG. 6 depicts single entities such as a single user device 606, a single application, 602, a single ZTNA appliance 608, a single reverse proxy server/client, and so forth, any number of users, applications, ZTNA appliances, and so forth, may be supported by the architecture described herein. This includes multiple instances of the same application, e.g., to scale access to an application, or multiple different applications hosted by a customer. This may also or instead include multiple, unaffiliated customer premises and customers using the cloud computing platform as a multi-tenant resource, as well as multiple cloud computing platforms collectively supporting a data plane for one or more customers or applications. Thus, any number of entities, connections, devices, servers, appliances, and the like may be used consistent with this disclosure, unless a specific number is explicitly provided or otherwise clear from the context. A number of additional features, configurations, and uses of the ZTNA environment are now provided.

Figure 7:
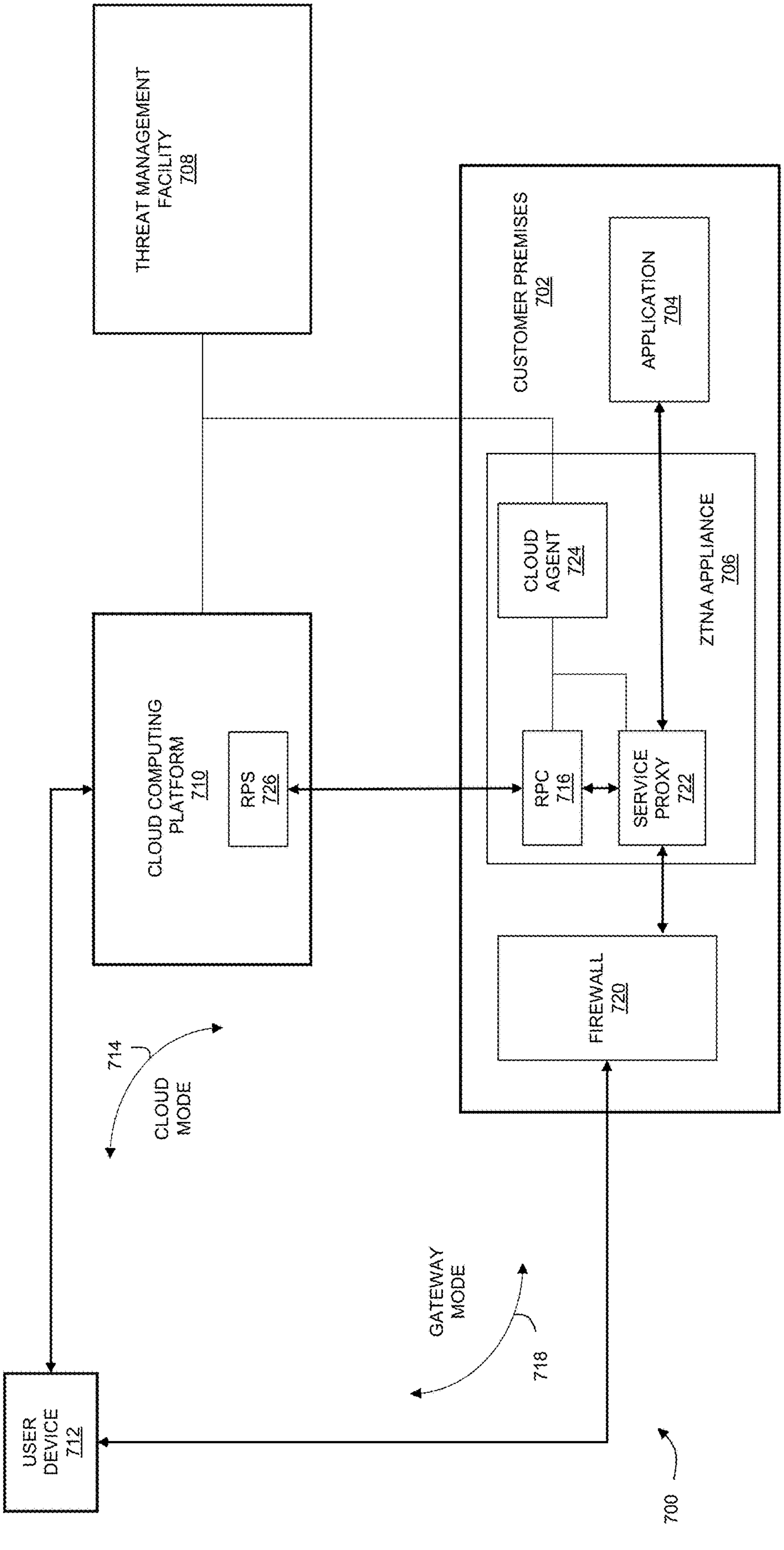
FIG. 7 shows a hybrid appliance for zero trust network access to customer applications.

FIG. 7 shows a hybrid appliance for zero trust network access to customer applications. In general, a zero trust network access appliance deployed at a customer premises can support a gateway mode and a cloud mode. In the gateway mode, the appliance may operate as a zero trust network access gateway and provide zero trust network access to applications hosted at the customer premises using a firewall at the customer premises for network security. In the cloud mode, the appliance may initiate a secure connection with a remote, cloud computing platform that provides a front end for zero trust network access. A threat management facility for the customer may provide a control plane for managing zero trust network access provided through the cloud computing platform, and for selecting between the cloud mode and the gateway mode for the appliance. In general, the applications, appliances, gateways, customer premises, firewalls, cloud computing platforms, threat management facilities, and other components may be any as described herein.

As shown in FIG. 7, the system 700 may include a customer premises 702 hosting an application 704 through a ZTNA appliance 706. The ZTNA appliance 706 may be managed by a threat management facility 708, all as generally described herein. A cloud computing platform 710 may host a ZTNAaaS service that provides a configurable data plane for ZTNA access to the application 704, e.g., by a user device 712. The ZTNA appliance 706 may be a hybrid appliance configured to operate in either a cloud mode or a gateway mode. In the cloud mode, the hybrid appliance may provide a first data path 714 for the application 704 through the cloud computing platform 710 (via a reverse proxy client 716). In the gateway mode, the hybrid appliance may provide a second data path 718 through a firewall 720 on the customer premises 702. The ZTNA appliance 706 may generally include a service proxy 722, such as any of the service proxies described herein, configured to manage ZTNA functions of the ZTNA application, and further configured to switch between the cloud mode and the gateway mode, e.g., under control of a cloud agent 724 securely coupled to the threat management facility 708.

According to the foregoing, there is disclosed herein a system 700 including an application 704 hosted on a customer premises 702. The system 700 may also include a firewall 720 between the customer premises 702 and a public data network (not shown), and a threat management facility 708 configured to manage security for the customer premises 702. The system 700 may also include a cloud computing platform 710 hosted remotely from the customer premises 702, and the cloud computing platform 710 may be configured to provide zero trust network access to the application 704 by a user device 712 operated by a user associated with the customer premises 702. The system 700 may also include a ZTNA appliance 706 hosted on the customer premises 702.

As described herein, the ZTNA appliance 706 may be a hybrid appliance configured to respond to a user input (e.g., from an administrative console of the threat management facility 708) by selecting between operating in a gateway mode and operating in a cloud mode. In the gateway mode, the ZTNA appliance 706 may operate as a zero trust network access gateway to provide zero trust network access from the public data network to the application 704 through the firewall for the customer premises 702. In the cloud mode, the ZTNA appliance 706 may act as a zero trust network access connector coupling the application 704 hosted on the customer premises 702 to the cloud computing platform through a secure tunnel to provide zero trust network access from the public data network to the application 704 through the cloud computing platform 710. The threat management facility 708 may generally provide a control plane for configuring the zero trust network access appliance to operate in the cloud mode or the gateway mode, e.g., by accessing the ZTNA appliance 706 through the cloud agent 724.

As also generally described herein, the ZTNA appliance 706 may be configured to authenticate a user on the user device 712 (or in some instances, the user device 712 itself) for zero trust network access to the application 704, e.g., with user credentials, one or more other authentication factors, or any combination of these or the like. For example, the ZTNA appliance 706 may authenticate using biometric authentication factors, hardware-based tokens or authentication factors, software-based tokens or authentication factors, user credentials, and so forth. In one aspect, a heartbeat from a user device, such as any of the heartbeats described herein, may include a secure (e.g., encrypted or signed) assertion of a health status of the user device, which may be used as an authentication factor when controlling access to the application 704 through the zero trust network access appliance. In one aspect, the ZTNA appliance 706 may authenticate the user using a third party identity management platform external to the customer premises 702, or using any other source of trust and/or identity information.

In another aspect, the cloud computing platform 710 may be configured to authenticate the user for zero trust network access to the application 704, e.g., by providing an authentication server or other authentication infrastructure through the secure tunnel provided by the reverse proxy client 716, and/or using a secure connection to the threat management facility 708 or a separate, trusted source of authentication services.

As also generally described herein, the cloud computing platform may provide a data plane for zero trust network access to the application 704 hosted on the customer premises 702. The system 700 may also include a reverse proxy server 726 on the cloud computing platform 710, which may be configured to create the secure tunnel with the ZTNA appliance 706 hosted on the customer premises 702. In one aspect, the ZTNA appliance 706 may be configured to make an outbound connection to the reverse proxy server 726 of the cloud computing platform 710, authenticate to the reverse proxy server 726 with an authentication server (not shown) hosted on the cloud computing platform 710, establish a secure tunnel between the ZTNA appliance 706 and the reverse proxy server 726, and use the secure tunnel to provide zero trust network access by the user of the user device 712 to the application 704 that is hosted on the customer premises 702.

In one aspect, the threat management facility 708 may be configured to provide a user interface for administrative configuration of the ZTNA appliance 706 and the cloud computing platform 710. For example, the user interface may facilitate user selection between the gateway mode and the cloud mode for the ZTNA appliance 706.

More generally, there is disclosed herein a system for zero trust network access to a customer application comprising an application 704 hosted on a customer premises 702 and a ZTNA appliance 706 hosted on the customer premises 702, where the ZTNA appliance 706 is configured to respond to a user input by selecting between a gateway mode and a cloud mode. In the gateway mode, the ZTNA appliance 706 may operate as a zero trust network access gateway to provide zero trust network access to the application 704 at the customer premises 702. In the cloud mode, the ZTNA appliance 706 may act as a zero trust network access connector coupling the application 704 hosted on the customer premises 702 to a cloud computing platform 710 to provide zero trust network access to the application 704 at the cloud computing platform 710. When operating as the zero trust network access gateway, the ZTNA appliance 706 may generally expose the application 704 to a data network through a firewall 720 of the customer premises 702, which may perform any suitable firewall functions for securing the customer premises 702 against malicious activity. When operating as a zero trust network access connector, the ZTNA appliance 706 may expose the application 704 to the data network through a secure tunnel, e.g., a secure tunnel between the ZTNA appliance 706 and a reverse proxy server 726 on the cloud computing platform 710.

The system 700 may also use any of the other cloud computing or other components described herein. For example, the system 700 may include a service proxy on the cloud computing platform 710, the service proxy coupled to the reverse proxy server 726 and configured to expose the application 704 to a data network for access by remote users. The system 700 may also or instead include a network load balancer coupling the service proxy to the data network. The network load balancer facing the data network may, for example, be configured to select a service proxy at the cloud computing platform for responding to a request for the application 704, and/or may be configured to select a service proxy from cluster of service proxies for responding to a request from the data network for the application 704. The system 700 may also or instead include a network load balancer between the cloud computing platform 710 and the customer premises 702, which may be configured to select a reverse proxy server from among a number of reverse proxy servers for handling a connection between the zero trust network access connector and the cloud computing platform 710.

It will be appreciated that all of the foregoing methods and systems may be used along with one another or in any suitable combination(s). Thus, for example, an abstraction layer may be used on the network front end for a cloud-based data plane, and dynamic tunnel scaling may be used on the customer premises back end. All such combinations are intended to fall within the scope of this disclosure unless specifically stated otherwise.

Figure 8:
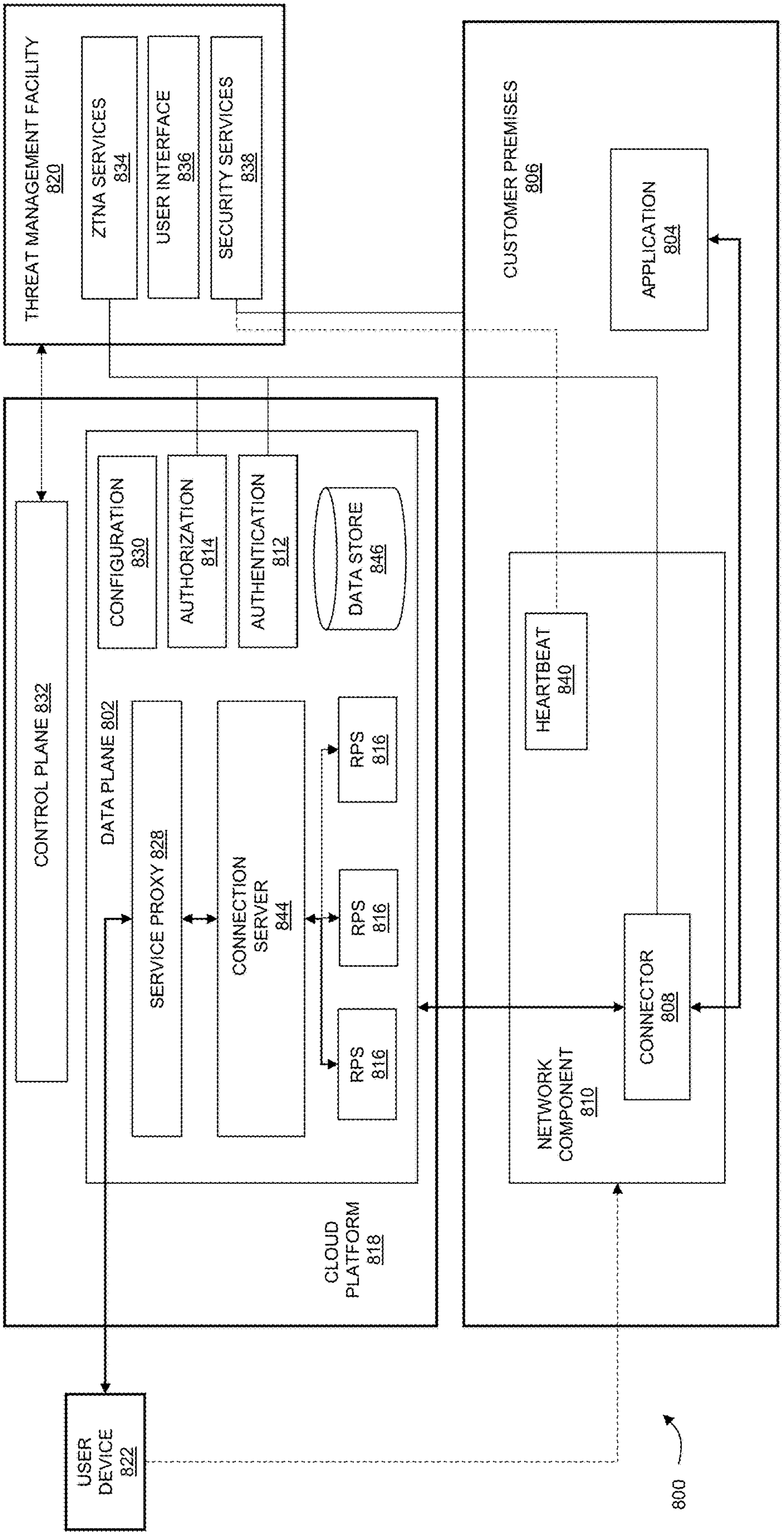
FIG. 8 shows a connector deployed in a firewall for ZTNA access to an application hosted on a customer premises.

FIG. 8 shows a connector deployed in a firewall for ZTNA access to an application hosted on a customer premises. In general the system 800 may include a data plane 802 for zero trust network access, and may include any of the components described, e.g., with reference to FIGS. 6 and 7, except where differences are specifically noted. The data plane 802 may be connected to an application 804 on a customer premises 806 via a connector 808 that is deployed, e.g., on a network component 810 such as a firewall or other network component on the customer premises 806 where the application 804 is hosted. More generally, the network component 810 may be deployed on the customer premises 806, and may manage access to the customer premises 806 from an external network. As generally described herein, this may include managing direct external access to the customer premises 806, e.g., where the network component 810 operates as a firewall for external networks, as well as access to the customer premises 806 through the cloud-based data plane 802, e.g., where the data plane 802 is configured to support ZTNA access to the application 804 hosted on the customer premises 806.

By moving ZTNA-related services such as an authentication service 812, an authorization service 814, and tunnel components such as one or more reverse proxy servers 816 to a cloud platform 818 hosting the cloud-based data plane 802, these components can be removed from the architecture of the connector 808, which can advantageously be simplified for deployment as single executable, binary, software package, or the like, while leveraging the security and control services of a threat management facility 820 for use with the cloud-based data plane 802 for ZTNA access. Thus in one aspect, the data plane 802 may include a data plane for zero trust network access to customer-premises resources, wherein the data plane 802 is deployed in a cloud platform 818 external to the customer premises 806, and wherein the cloud platform 818 includes authentication components, authorization components, and tunnel components for supporting zero trust network access services through the data plane 802 for the application 804 hosted on the customer premises 806.

In operation, a user device 822, such as any of the endpoints, compute instances, or other computing devices or the like described herein, may initiate a connection to the application 804 hosted on the customer premises 806. As described in FIG. 7 above, this may include directly connecting to the network component 810 when the connector 808 is in a gateway mode or this may include connecting to the cloud-based data plane 802 of the cloud platform 818 when the connector 808 is in a cloud mode. The cloud platform 818 (also referred to herein as a "cloud computing platform") may include other components such as a first network load balancer for balancing network facing traffic (not shown), a second load balancer for balancing customer premises traffic (not shown), a service proxy 828, a configuration service 830 for the data plane 802, a control plane 832, e.g., to facilitate configuration of ZTNA resources with the threat management facility 820, and so forth.

The threat management facility 820 may include any of the threat management facilities described herein. In general, the threat management facility may be configured to support secure operation of the customer premises 806 and the ZTNA network. For example, the threat management facility 820 may be configured to remotely provide security services for the customer premises 806, e.g., through the security services module 838, to remotely manage the network component 810 and/or connector 808 on the customer premises 806 through a secure connection, and provide a web based user interface for a user to manage the network component 810 (or connector 808) though the threat management facility 820. The threat management facility 820 may also include a variety of modules to support these and other operations of the cloud-based data plane 802, such as a ZTNA services module 834, a user interface module 836, and a security services module 838.

In general, the ZTNA services module 834 may support configuration and use of ZTNA services via the data plane 802. For example, the ZTNA services module 834 may be used to configure the data plane with the configuration service 830, and to configure and operate the authorization service 814 and authentication service 812. The user interface module 836 may support a web-based interface or other command line and/or graphical user interface for management of security services and ZTNA services with the threat management facility 820. The security services module 838 may support any of the security services described herein for use with a customer premises 806 or other enterprise network or portion thereof. In one aspect, the security services module 838 may monitor, query, or otherwise manage a heartbeat service 840 on the customer premises 806. The heartbeat service 840 may in general provide a periodic attestation of health for the customer premises 806, or for a component of the customer premises such as the network component 810. This attestation may be transmitted to the threat management facility 820 as a heartbeat for use in monitoring the security posture of the customer premises 806. As a significant advantage, this heartbeat service 840 may also be used to assist in the configuration and monitoring of the connector 808. The security services module 838 of the threat management facility 820 may more generally be coupled via a secure tunnel or other secure communications channel to the customer premises 806. Once the threat management facility 820 has been set up to provide security services to the customer premises 806 in this manner, the secure communication channel can also advantageously provide a secure technique for managing the configuration and deployment of the connector 808 via the user interface module 836 of the threat management facility 820.

It will be noted that in the system 800 of FIG. 8, the customer premises 806 does not host a separate ZTNA appliance (compare FIG. 6). Instead, a connector 808 is deployed within the network component 810 (e.g., a firewall of other network component) on the customer premises 806, where the connector 808 can, under control of the threat management facility 820, manage ZTNA connections from external users to the application 804. In general, the connector 808 may be deployed as a binary or other executable program, software package, or the like that executes on the network component 810. The threat management facility 820 may associate the connector 808 with the network component 810 for purposes of remote management, and may provide management of the connector 808 to a user through a web-based user interface of the threat management facility 820, as supported, e.g., by the user interface module 836. In one aspect, the connector 808 may be configured to communicate with the data plane 802 through a secure tunnel created using the tunnel components (e.g., the reverse proxy servers 816 and service proxy 828) of the cloud platform 818. In general, the connector 808 may be configured to controllably support zero trust network access to the application 804 through the network component 810.

The connector 808 may also be configured to manage zero trust network access to the application 804 through the data plane 802 using the authentication components (e.g., authentication service 812) and the authorization components (e.g., the authorization service 814) of the cloud platform 818.

As noted herein, the network component 810 may include a firewall. In general, the connector 808 may be configurable through the web based user interface of the threat management facility 820, e.g., as supported by the user interface module 836, to provide access to the application 804 through either a first endpoint connection from the user device 822 through an external network to the firewall on the customer premises 806 (e.g., in a gateway mode) or a second endpoint connection from the user device 822 to the data plane 802 for zero trust network access (e.g., in a cloud mode).

The customer premises 806 may also include a heartbeat service 840. The heartbeat service 842 may execute on the network component (e.g., firewall or the like), or within the connector 808 executing on the firewall, or at any other suitable location. In general, the heartbeat service 840 may provide periodic, cryptographically secure attestations of the health and/or security status of the connector 808, network component 810, or other component(s) of the customer premises 806, and may be used by the threat management facility 820 to support the secure management of the ZTNA framework described herein.

In one aspect, the data plane 802 may include a connection server 844, such as a WebSocket server to support bi-directional, secure communications between the connector 808 (or a reverse proxy client executing in the connector 808) on the customer premises 806 and the reverse proxy server(s) 816 in the data plane 802. In general, the connection server 844 may simplify the connector 808 by permitting improved management and security of ZTNA traffic within the data plane 802. The connection server 844 is described in greater detail below with reference to FIG. 10.

A data store 846 may store, e.g., configuration information, tenant information, connection information, and the like for use in the creation and deletion of secure tunnels, and the management of related ZTNA traffic, data plane configuration, and so forth. As described herein, components of the system 800, such as connectors 808, the threat management facility 820, and the connection server 844, may report connection information to the data store 846, which may be made globally available within the data plane 802 to facilitate improved routing of new connections from a user device 822 to the connector 808, e.g., by supporting load balancing, target service levels, and so forth.

Figure 9:
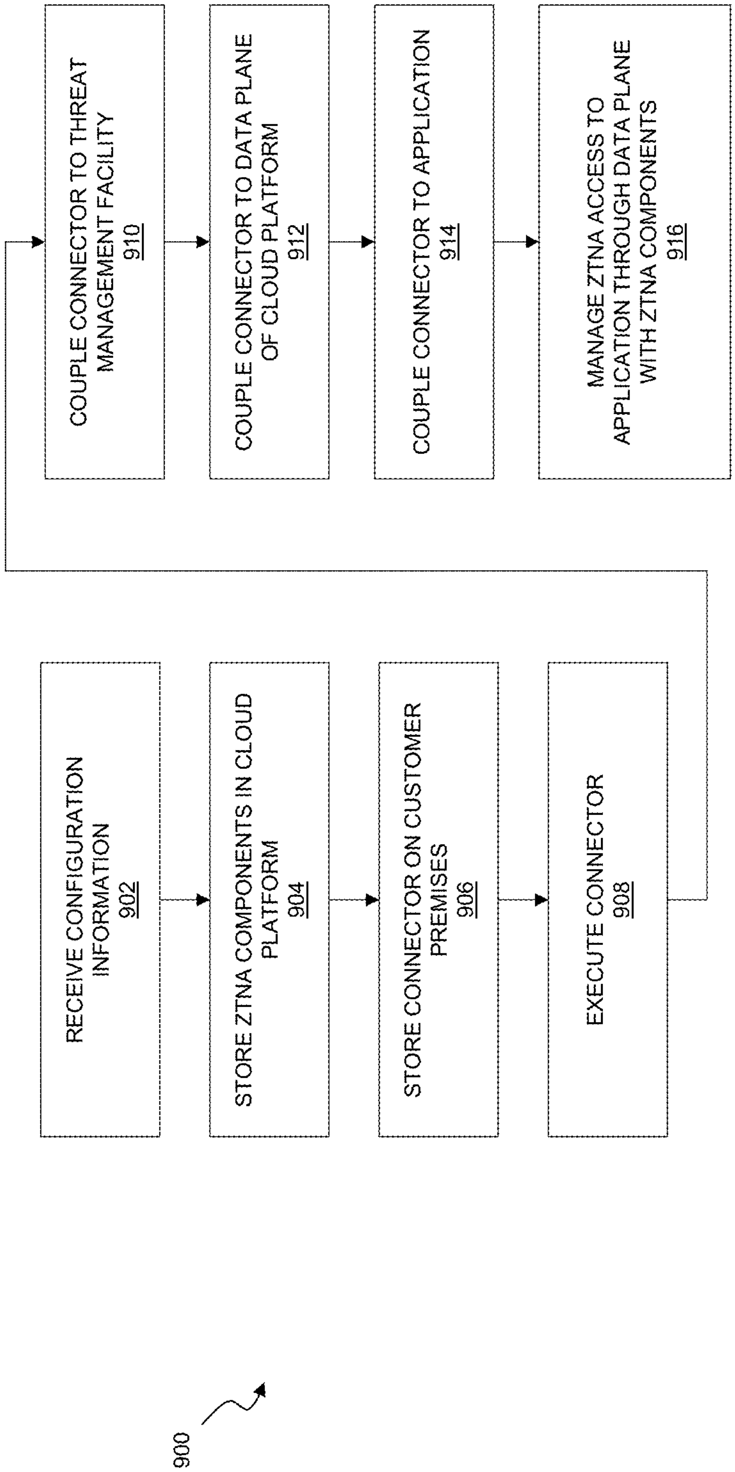
FIG. 9 is a flow chart of a method for operating a connector for ZTNA access to an application hosted on a customer premises.

FIG. 9 is a flow chart of a method for operating a connector for ZTNA access to an application hosted on a customer premises. In general, the method 900 may use any of the modules, services, components, and the like described herein. The application may include one or more of a productivity application, a database application, and a financial application, or any other application(s), service(s), tool (s), data resource(s) and the like that an enterprise may wish to make securely available to remote users using ZTNA techniques. As described herein, the disclosed architecture generally supports a distributed deployment of a ZTNA framework, e.g., where a cloud-based data plane executes on a cloud platform remote from the customer premises, and a threat management facility for the customer premises executes on a cloud platform remote from the customer premises (and optionally on a second cloud platform external to the cloud platform for the data plane).

As shown in step 902, the method 900 may include receiving configuration information for the connector from the threat management facility. This may include an initiation by a user or admin of the creation of a connector on the customer premises for ZTNA access to one or more application. In general, the user/admin may access the user interface for the threat management facility and provide a request for ZTNA services, along with any necessary configuration information. For example, the configuration information may identify an application on the customer premises that is to be offered as a zero trust network access service. The configuration information may identify the application using, e.g., a file name, a local path, a network address, or any other information suitable for locating and accessing the application within the customer premises domain.

The user interface may provide additional information to the user, and may receive additional configuration information from the user. For example, the user interface may display other applications executing on the customer premises that are currently available for ZTNA use, as well as other security information or application availability information for the customer premises, and any other information that may be useful to the user when evaluating a new deployment of an application. In another aspect, the user may be presented with available deployment options. For example, the user may be presented with a list of available firewalls on the customer premises that have ZTNA connector capabilities, or that can be configured to receive and deploy connector capabilities. The user interface may chose a suitable firewall from this list for use as a connector for the application. The user may also or instead provide other information such as a data plane PoP, certifications, keys, and so forth. Once a connector is executing on the customer premises, the user may then access and select one or more applications executing on the customer premises for ZTNA deployment through the connector.

As shown in step 904, the method 900 may include storing tunnel components, authentication components, and authorization components for a data plane of a cloud-based zero trust network access service on a cloud platform. While this is described as occurring after a configuration request from a customer, it will be understood that the necessary components may suitably be deployed for use at any time before (or during) the first request for ZTNA access to a customer premises application. In general, the data plane may support agentless and/or agent-based application access to the application hosted on the customer premises. Storing the components may also or instead include configuring these components for use in ZTNA access to the application. The tunnel components may, for example, include a reverse proxy server and/or other network components suitable for creating and maintaining a secure connection between the data plane of the cloud platform and the connector executing on the customer premises.

The authentication components may, for example, include at least one Open Authorization 2.0 proxy. An Open Authorization 2.0 (OAuth 2.0) proxy is a component that acts as an intermediary between a client application and an OAuth 2.0 authorization server. The OAuth 2.0 proxy may generally handle an OAuth 2.0 authentication flow, e.g., by redirecting users to an authorization server, handling callbacks, and exchanging authorization codes for access tokens. The OAuth 2.0 proxy can also usefully manage the storage, renewal, and revocation of access tokens and refresh tokens for secure access to remote resources.

The authorization components may include at least one Open Policy Agent. Open Policy Agent (OPA) is an open-source, general-purpose policy engine that enables policy-based control for cloud-native environments. OPA can facilitate the implementation, management, and enforcement of policies across an enterprise network for a customer, and can advantageously support policy management across a wide variety of systems including cloud-based infrastructures such as Kubernetes, microservices, and so forth. By decoupling policy decision-making from the application logic, OPA provides a unified framework to enforce policies for an enterprise consistently across different components of a system, and in particular, can facilitate the enforcement of enterprise policies within the cloud-based data plane where external users are connected to ZTNA applications hosted on customer premises.

In one aspect, the services deployed in the data plane to support the simplified connector may be modified for use with multiple tenants within a single data plane. For example, an OAuth 2.0 proxy may be modified to handle multiple tenants in a scalable way by making it stateless, and retrieving configuration information from the data store at the runtime. Similarly, OPA may be configured to be stateless, and configured to make an HTTP request to get the specific tenant and application policy data for each connection.

As shown in step 906, the method 900 may include storing a connector for zero trust network access on a customer premises. This may be an executable, binary, library, or combination of these or other software components, which may be collectively unpacked and installed as necessary, and executed on a firewall or other network component or the like on the customer premises to couple an application hosted on the customer premises to the data plane of a cloud-based ZTNA service. In one aspect, the connector may include a data plane client for secure communications with the data plane of the cloud-based zero trust network access service. For example, where the data plane uses a reverse proxy server for secure communications with the customer premises, the connector may include a corresponding reverse proxy client. The connector may also or instead include a cloud agent for secure communications with the threat management facility, such as any of the cloud agents or the like described herein.

As shown in step 908, the method 900 may include executing the connector for zero trust network access on a firewall or other network component of a customer premises. While the connector may be located in numerous locations within the customer premises architecture and/or software stack, a firewall may advantageously provide a resource that includes preexisting network capabilities and interfaces, and that is already managed for security and policy purposes by a threat management facility for the customer premises.

As shown in step 910, the method 900 may include coupling the connector to a threat management facility, such as any of the threat management facilities described herein. In one aspect, the connector may periodically transmit a heartbeat or the like to the threat management facility containing health status information for the firewall, the connector, or any other component of the customer premises that might usefully be monitored in the context of ZTNA deployment. For example, by providing health information about a firewall that executes the connector, the threat management facility can usefully monitor this portion of the ZTNA data path and ensure, e.g., the security of external connections to and from the customer premises along with other aspects of the ZTNA system such as the cloud platform, the data plane, and the like. This also permits prompt termination of ZTNA services when the connector or related network components on the customer premises become compromised in a way that prevents the transmission of a healthy heartbeat, or when a termination is explicitly requested by the user via the user interface of the threat management facility.

As shown in step 912, the method 900 may include coupling the connector through a secure tunnel to the cloud platform using the tunnel components of the cloud platform. For example, where the data plane uses a reverse proxy server, this may include creating a secure tunnel with a reverse proxy client of the connector (or firewall or other network component executing the connector).

As shown in step 914, the method 900 may include coupling the connector to the application on the customer premises. This may use identifying information for the application that was received with the initial configuration information from the user. Where the requested application is not available, the user may be prompted for corrected information or other suitable remediation. In one aspect, the communications described herein may be secured, e.g., using a number of authentication tokens. For example, in one embodiment, the connector may be supplied with two tokens in response to a request to deploy a new ZTNA application. The tokens may be securely provided to the connector using a configuration file, environment variables, or the like. A first token may be used to connect to the threat management facility (in step 912), and the other token may be used to connect to the data plane (in step 914). The token for the threat management facility may persist until the connector is deleted or reconfigured. The connector can use this first token to authenticate with the threat management facility, and with a WebSocket server or the like for push notifications from the data plane. In one aspect, multiple instances of a connector binary can use the same token to communicate with the threat management facility, e.g., to facilitate use of multiple instances or containers for load sharing ZTNA traffic. A second token can be used to connect to the data plane, e.g., by presenting the second token to the reverse proxy server when the connector initiates a connection. The data plane can validate this token independently with the threat management facility before authorizing the secure tunnel between, e.g., a reverse proxy client of the connector and a reverse proxy server of the data plane.

As shown in step 916, the method 900 may include managing zero trust network access to the application by a user through the data plane by authorizing and authenticating the user for the application with the authentication components and authorization components executing on the cloud platform.

In one aspect, a heartbeat from the firewall may be used to initiate execution of a connector. For example, a periodic heartbeat may be sent from the firewall to the threat management facility, and when a connector is requested by an admin, the threat management facility may respond with a connector identifier that associates a particular connector with a particular firewall. When the firewall detects this association in the response from the threat management facility, the firewall may request configuration information from the threat management facility and use the response to configure and execute the connector binary (or other code). This approach advantageously uses the pre-existing, secure communications between the customer premises and the threat management facility to initiate the deployment of a new ZTNA service from the customer premises.

In a more detailed embodiment where the connector is a binary executable, the connector may, when it launches, make a REST API call to a ZTNA-Config microservice executing on the threat management facility to fetch connector and application details using a token received as part of the connector binary configuration information (e.g., the first token described above). The connector binary may also initiate a WebSocket connection to a ZTNA push notification service on the threat management facility to listen for the configuration changes to the connector and applications. The connector may also use a data plane token (e.g., the second token described above) available in configuration information to establish tunnels with data plane. For example, this may include one tunnel for each agent-less application configured in the threat management facility, one tunnel for each Transmission Control Protocol (TCP) agent-based application, and one tunnel for all User Datagram Protocol (UDP) agent-based applications. These tunnels may be scaled up and down based on load, as further described herein. Each tunnel may be individually authenticated via a REST API request to a ZTNAaaS-Auth microservice executing on the cloud platform of the data plane. The ZTNAaaS-Auth microservice may take the token provided by the reverse proxy server from the REST request and make a REST API call to the ZTNAConfig microservice executing on the threat management facility. The ZTNA-Config microservice may validate the token and send back a response to the ZTNAaaS-Auth microservice, which may inform the reverse proxy server to create the requested tunnel.

Once tunnel authentication is completed, the reverse proxy server may make a request to the ZTNAaaS-Config-Sync microservice in the data plane that contains connection details such as a Tenant ID, Connector ID, and Tenant region information. Using this information, the ZTNAaaS-Config-Sync microservice makes REST API calls to the ZTNA-Config microservice to fetch the Connector, Applications, IDP, Policy and other config details and stores them in a data store associated with the data plane. The service proxy (or proxies) in the data plane may then receive a notification from the ZTNAaaS-Config-Sync microservice about the changes, and may reconfigure the service proxy with routes for each agent-less application. The service proxy may also be configured with the customer uploaded certs for the connector domain, and all agent-less applications.

Figure 10:
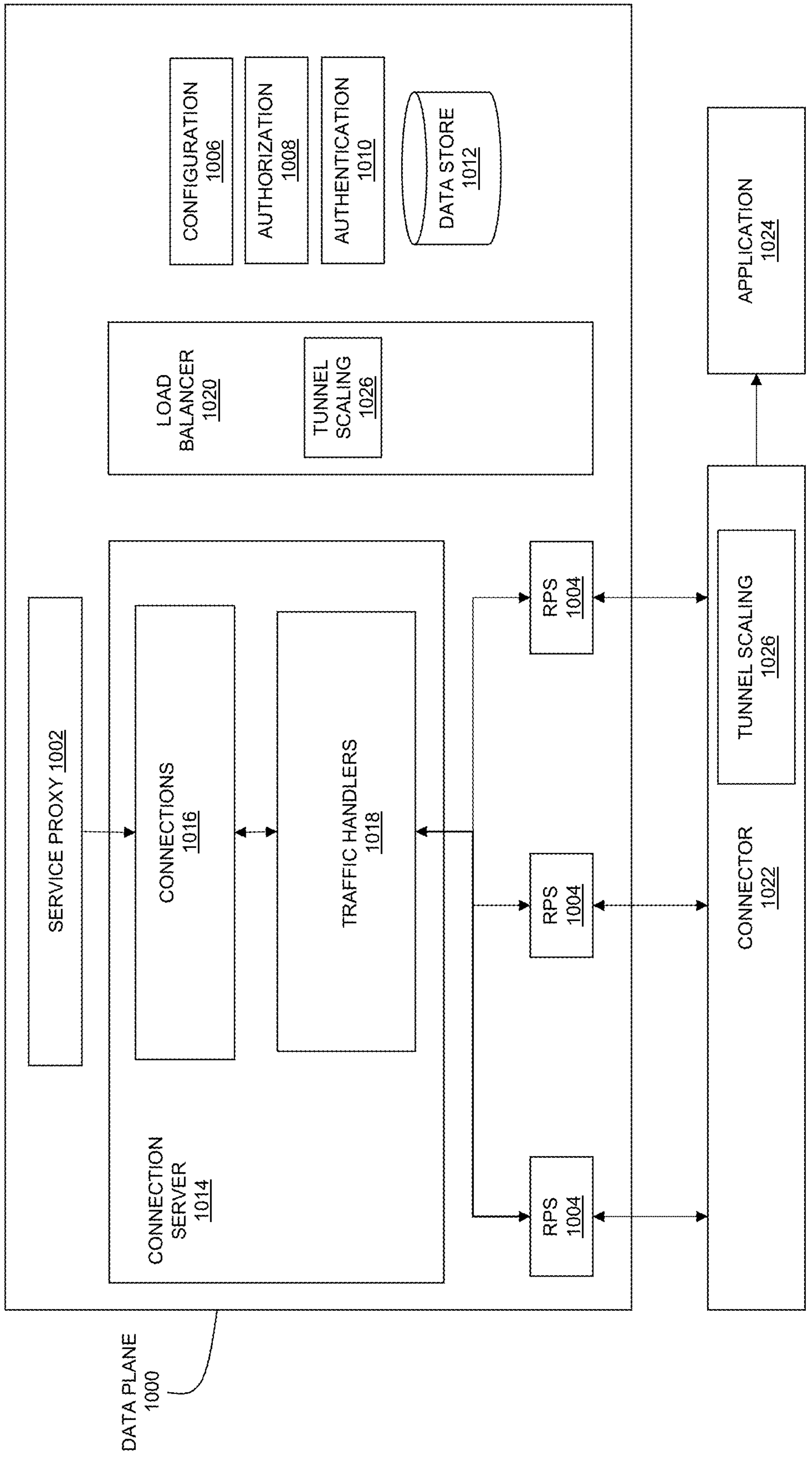
FIG. 10 shows a connection server for a cloud-based ZTNA data plane.

FIG. 10 shows a connection server for a cloud-based ZTNA data plane. In order to efficiently manage secure tunnels between a ZTNA connector (on the customer premises hosting a ZTNA application) and a cloud-based ZTNA data plane 1000, tunnel components such as a connection server 1014 can be run on the cloud platform that is hosting the data plane 1000. As a significant advantage, this simplifies customer ZTNA deployments by permitting a reduction in the size and complexity of the connector that is deployed to the customer premises, while permitting secure management of ZTNA applications and improved global visibility of ZTNA traffic through the data plane for custom internal load balancing and the like. In one aspect, the connection server 1014 may include a WebSocket server, which implements the WebSocket protocol to enable full-duplex communication between connector and the data plane over a single, long-lived connection. As a significant advantage, the WebSocket protocol allows secure, bi-directions communications between client and server, and can be more efficient than traditional HTTP-based communication because a WebSocket server allows both the client and server to send messages to each other independently, without the need to repeatedly open and close connections. However, the principles described herein may usefully be employed with any other similar communications server(s) and/or protocol(s) suitable for use in a ZTNA data plane.

As illustrated in FIG. 10, a data plane 1000 for a ZTNA system may include a service proxy 1002, one or more reverse proxy servers 1004, a configuration service 1006, an authorization service 1008, an authentication service 1010, and a data store 1012 such as a Redis data base or the like, which may be any of those described herein. In general, although single components are illustrated, the data plane 1000 may include any number of service proxies, load balancers, reverse proxy servers, authorization and authentication services, and so forth.

The connection server 1014 may run in the data plane 1000, and may maintain one or more connections 1016 between users (from the service proxy 1002) and applications (from the reverse proxy servers 1004). The connection server 1014 may convert tunneled packets in the connections 1016 with traffic handlers 1018. This may, for example, include a gVisor netstack in the user space to convert tunneled packets from agents into TCP connections. In one embodiment, the gVisor netstack may take packets and give a callback when there is a new TCP connection. From the data plane 1000, a new TCP connection can be established to the corresponding application over a secure tunnel to one of the reverse proxy servers 1004. It will be understood that while a single connection server 1014 is illustrated, the data plane 1000 may include any number of connection servers which may, for example, be instantiated and torn down according to load in a virtualized environment of the cloud computing platform for the data plane 1000.

The connection server 1014 may generally operate as a secure communications server. For example, the connection server may receive a new connection 1016 from the service proxy 1002, and may authorize the connection using the authorization service 1008 or other policy manager, as more generally described herein. The connection server 1014 may then request information from the data store 1012, such as a Tenant ID, Tenant Region, Connector ID, and a cookie of an authenticated user. The connection server 1014 may use these details for policy management by communicating with the authorization service 1008 and the authentication service 1010 to ensure that the traffic is authorized and that the user is authenticated.

In a WebSocket server implementation, for each new connection, the connection server 1014 may create a connection 1016, along with session objects and a traffic handler 1018 with a corresponding gVisor netstack having TCP and UDP protocol handlers. In one aspect, each connection 1016 may have its own corresponding traffic handler 1018 (e.g., netstack instance) that handles packets over the corresponding connection 1016. A WebSocket adapter may be wrapped around the WebSocket connection and implement the gVisor netstack's LinkEndpoint interface so that its WebSocket connection can be used as a network interface card (NIC) for the gVisor netstack. When gVisor reads packets from the NIC, it makes ReadMessage calls on a WebSocket connection, and similarly for write calls gVisor makes WriteMessage calls on a connection. Also, the WebSocket adapter may handle control messages that are received from a user device or agent, and pass them to the session object for further processing. Session objects may receive the control messages from agents like endpoint state, App IP mapping, state change, etc. and may include endpoint health status for policy evaluation, as well as IP mappings for identifying the application on a destination IP address.

Each traffic handler 1018 may include a gVisor netstack configured with TCP and UDP protocol handlers as part of its initialization. When there is a new TCP connection from an agent, then netstack calls the handler callback. As part of this callback, the traffic handler 1018 extracts a destination IP address and finds the corresponding application, which has already been received in control messages and is already available in the session object. The handler 1018 may check whether a destination port is allowed or not and may initiate a policy evaluation using the authorization service 1008, e.g., via a request to an Open Policy Agent. If both port and policy checks are allowed then the traffic handler 1018 may request tunnel details using a load balancer object, and based on the load, the connection server 1014 may select a tunnel and use the corresponding tunnel details to make a SOCKS proxy connection. SOCKS is an Internet protocol that exchanges network packets between a client and server through a proxy server. SOCKS5 optionally provides authentication so only authorized users may access a server. Generally, a SOCKS server proxies TCP connections to an IP address, and provides a means for UDP packets to be forwarded. Once the connection is established with the destination application over the SOCKS proxy, then the connection server 1014 relays data through the corresponding connection 1016. The connection server 1014 may also periodically check (e.g., every five minutes) to ensure that the connection 1016 is compliant with a corresponding policy, and may terminate the connection 1016 if the compliance check fails. This approach can advantageously ensure ongoing compliance of ZTNA usage with customer policies.

For UDP packets, the traffic handler 1018 netstack may give a callback to a UDP handler and find a corresponding application on the customer premises based on the destination IP address. The traffic handler 1018 may also perform ports and policy checks as described herein. In the case of the UDP handler, the traffic handler 1018 may also receive and relay subsequent UDP packets that are destined for the same destination IP address and port from the same source IP and port (tuple). For UDP packets, the traffic handler 1018 may also request a tunnel from a load balancer, and use that tunnel for a UDP-over-TCP connection. The policy compliance may be periodically checked, e.g., every five minutes.

In general, the connection server 1014 may perform a policy compliance check at any suitable interval, e.g., with a corresponding traffic handler 1018 or other component. The connection server 1014 may, for example, evaluate the policy by making the REST call to an OPA HTTP API of the authorization service 1008. The connection server 1014 may send connection information such as a user's cookie, Tenant ID, Connection ID, Application ID, and health status (e.g., heartbeat) details as OPA policy request input, and based on the response from the authorization service 1008, the connection server 1014 may update a session object cache with the current policy evaluation status. This policy status may be shared or reused for multiple connections for the same application.

According to the foregoing, in one aspect, there is disclosed herein a system for managing connections in a ZTNA data plane. The system may include an application an application hosted on a customer premises; a threat management facility for the customer premises, the threat management facility remote hosted from the customer premises on a cloud resource; a data plane for zero trust network access, wherein the data plane is deployed in a cloud platform external to the customer premises and the threat management facility; and a tunnel component in the data plane, such as the connection server 1014 described herein. The tunnel component configured by the threat management facility to manage secure tunnels between the data plane and the customer premises. The system may also include a connector deployed on the customer premises. The connector may be configured remotely from the threat management facility, and may be configured to communicate with the data plane through a secure tunnel created using the tunnel component of the data plane. The connector may be further configured to provide zero trust network access to the application for an external user through the data plane.

The tunnel component may include a WebSocket server. The system may further include a policy manager executing on the WebSocket server and authorizing application traffic using Open Policy Agent. The tunnel component may convert traffic in the data plane to TCP traffic for communication with the connector. The connector may execute on a firewall for the customer premises.

In another aspect, the connection server 1014 (or some other component of the data plane 1000) may include a load balancer 1020 that chooses a suitable tunnel for a new connection 1016. As a significant advantage, performing custom internal load balancing within the connection server 1014, or more generally within the data plane 1000, permits use of a range of available connection information for a customer, including useful data such as connections per tunnel, connections per connector, allocations of applications to tunnels, and so forth, based on information and the data store 1012 and other resources of the data plane 1000. This provides significant advantages over conventional network load balancing techniques, which respond to observable external characteristics of network flows, and are generally unable to sort through connection distributions within tunnels, per-customer tunnel allocations, per-application tunnel allocations, application usage, connection server loads within the data plane, and so forth.

In one aspect, the load balancer 1020 may choose a tunnel that is nearing capacity for a new connection in order to facilitate scaling down of other connections. For example, for tunnels capable of handling 10 TCP connections and a connection allocation of five connections for a first tunnel, eight connections for a second tunnel, and nine connections for a third tunnel, the load balancer may select the tunnel with nine connections for a new tunnel. This can facilitate scaling down (and out) of the least used tunnel). The connection server 1014 may manage connections in other ways. For example, the connection server 1014 may tear down tunnels with zero connections, or terminate connections that have been running for more than eight hours. The connection server 1014 may more generally enforce limits on a number of TCP or UDP connections that can run at any given time per WebSocket connection/agent tunnel.

In one aspect, the load balancer 1020 may be configured to retrieve connection information from the data plane such as connection counts, tunnel distributions, and so forth, and to use this information to provide load balancing information to the service proxy 1002, more specifically so that the service proxy 1002 can select a route to the customer premises (not shown) through the data plane 1000. Secure tunnels to a customer premises can also be scaled according to traffic using tunnel information available within the data plane 1000. In one aspect, tunnels can be scaled up by checking for connections and only adding a new tunnel when existing tunnels are full. In another aspect, tunnels can be scaled down by removing existing connections as they are taken down by users, and timing out connections that exceed a timeout window.

As a further advantage, connection information can be made generally available on a per-data plane-resource basis, as well as on a per-application, per-user, and per-customer basis because the connection server 1014 stores connection data in a persistent data store 1012 that is available to the data plane 1000. This permits custom load balancing within the data plane 1000 to facilitate optimizations of resource usage during traffic increases, traffic decreases, traffic shifts, and so forth.

In one aspect, the connections 1016 (e.g., WebSocket connections) handled by each connection server 1014 are stored in the data store 1012 and can be made available throughout the data plane 1000. This permits individual service proxies 1002 to make individual load balancing decisions for new connections based on the shared data in, e.g., a Redis data store or the like, rather that requiring continuous updates to service proxies 1002 as new load distribution information becomes available. In one aspect, the load balancer 1020 may retrieve a connection count for each connection server 1014, and may select a connection server 1014 to host a new connection based on a current connection count for each of the connection servers 1014. In order to propagate the choice of a connection server, the load balancer 1020 may be deployed in part as an HTTP filter that can be invoked before a router filter for the service proxy 1002, and will return an optimized host to override an upstream host provided by other external load balancing services or the like. That is, when a service proxy 1002 receives a new WebSocket connection request (e.g., in response to a user access to an agent-based application), the service proxy 1002 may initially query the load balancer 1020, which does a lookup in the data store 1012, applies any suitable analysis, and returns a selected connection server 1014 to the service proxy 1002. The service proxy 1002 can then route the connection to the selected connection server 1014, and the connection server 1014 can update the data store 1012 for use in subsequent load balancing.

In another aspect, connection count information may be used to load balance in a manner to maintain a desired level of connectivity and bandwidth for users, while also conserving data plane resources by optimizing the number of reverse proxy servers and connection servers executing in the data plane. In one aspect, this may include requesting customer and connector details, including all tunnel details such as the number of tunnels between each connect and the data plane, and the number of TCP and UDP connections served by each tunnel, from the data store 1012. For example, each connection server 1014 may maintain connections to multiple reverse proxy servers 1004, each of which maintains a secure tunnel with one or more connections to a connector 1022 on a customer premises. Each of these connections may then access an application 1024 hosted on the customer premises, however, conventional load balancing mechanisms cannot allocate this tunneled traffic in any customer-specific or application-specific manner. However, a load balancer 1020 executing inside the data plane 1000, with access to shared connection data in the data store 1012, can optimize these connections and tunnels in any suitable manner. For example, the load balancer 1020 may select a tunnel that is serving less than the configured number of connections. After selecting this tunnel, the load balancer 1020 may update tunnel connection counts in the data store 1012 so that other connection servers 1014 can view the updated connection counts and select their own appropriate tunnels. Once tunnel capacity is full for a particular tunnel, the load balancer 1020 may select another tunnel to proxy additional application access requests. Distributing requests for application access in this manner—based on connection counts—can improve the uniform distribution of application traffic among available tunnels.

In another aspect, connection data in the data store 1012 can be used to scale the number of tunnels up and down according to traffic. For example, where the connector 1022 creates one tunnel for each agentless application, as well as one SOCKS TCP tunnel and one SOCKS UDP tunnel for all of the TCP and UDP agent applications, it can be difficult to scale proxying of access requests over the single agentless application tunnel. Scaling tunnels up and down can be performed based on the number of connections getting proxied over a tunnel. In one aspect, the number of connections for scaling up a tunnel (e.g., to add a new tunnel) can be a configurable parameter. When the number of connections proxied via a tunnel reaches the configuration limit, then the connector 1022 may add one or more tunnels for a corresponding application. The load balancer 1020 may then distribute application access requests across the existing tunnels, including the new tunnel(s) added by the connector 1022.

In an example, to initiate access to an application 1024, the connector 1022 may connect to a threat management facility or other remote resource to obtain application configuration information for a ZTNA application hosted on the customer premises. If agentless applications are configured, the connector 1022 may create one tunnel per application. If agent applications are configured, the connector 1022 may create and/or use one tunnel for all agent-based applications. A reverse proxy server 1004 in the data plane may open a proxy port for each tunnel created by the connector. This port can be used to allow proxy agent applications access to TCP and UDP connections. When a user requests an application that has been configured through the data plane 1000, the incoming application request will terminate at a connection server 1014, which in turn can request the load balancer 1020 to retrieve tunnel details available in the data store 1012. A tunnel selection algorithm may then be applied as follows. The load balancer 1020 may retrieve data for all tunnels for the specified customer (e.g., tenant) and connector. These tunnels may then be sorted in descending order according to the total current connection count for each tunnel. The load balancer 1020 may then select a tunnel that is not full (e.g., currently serving the limit for a number of connections). If all tunnels are fully loaded, then the load balancer 1020 may randomly select one of the tunnels and wait for a new tunnel creation request from the connector 1022. The load balancer 1020 may, in the meantime, return the selected tunnel to the proxy for the agent application access request and update the connection count in the data store 1012 so that other instances of the connection server 1014 can uniformly distribute additional requests. The connector 1022 may keep a count of its own connections per tunnel, and create a new tunnel when the configuration limit for the connector 1022 is reached. Once the new tunnel is created, new requests can be proxied through the new tunnel.

In another aspect, when a particular application access is completed or an agent terminates an application usage, then the connection count for the corresponding tunnel can be decremented in the data store 1012 to support improved load balancing. In another aspect, where communications with the connector are distributed across a number of secure tunnels created by the network component, individual user-application connections may be distributed among these secure tunnels according to a global connection count maintained in a data store for the data plane. Using this connection count information, connections may be distributed in a manner that ensures suitable connectivity and bandwidth for users, while also conserving data plane resources by optimizing the number of network component instances executing in the data plane. More generally, by independently and globally managing connection servers, tunnels, connections within tunnels, and application usage, a load balancer 1020 within the data plane 1000 can improve cloud resource utilization (e.g., by scaling connection servers as needed), network resources (e.g., by scaling tunnels as needed), and customer resources (e.g., by scaling connector connections as needed) across a ZTNA data plane 1000 by optimally routing new access requests from a service proxy 1002 through the data plane 1000 and connector 1022 to an intended application 1024.

In another aspect, the load balancer 1020 and connection server 1014 may cooperate to migrate tunnels in order to balance traffic, or to facilitate the creation or termination of existing tunnels. For example, the connection server 1014 may be configured to migrate user connections between a plurality of secure tunnels that couple the cloud-based data plane 1000 to a customer premises. By enabling individual TCP connections to be migrated among tunnels, the connection server 1014 can advantageously manage tunnels independently of current tunnel-by-tunnel traffic requirements, e.g., for load balancing or other performance-related tasks such as removing lightly utilized tunnels during low traffic periods.

According to the foregoing, a system disclosed herein includes a data plane for zero trust network access to an application and a load balancer. The application may be hosted on a customer premises, and the data plane may be deployed in a cloud-based platform external to the customer premises. The data plane may include a plurality of connection servers configured to connect to the customer premises, and the data plane may include at least one service proxy configured to handle an incoming request from a user for the application. The load balancer may generally be configured to retrieve connection information for the data plane, and to provide load balancing information to the service proxy specifying one of the plurality of connection servers to connect the user to the customer premises for use of the application.

The plurality of connection servers may, for example, include WebSocket servers. The service proxy may include an Envoy proxy. The system may include a plurality of service proxies configured to receive load balancing information from the load balancer. The connection information may include a connection count for each of a number of secure tunnels from the plurality of connection servers to the customer premises. The connection information may also or instead include load balancing based on connection counts for each of a number of tunnels between the plurality of connection servers and the customer premises. The load balancing information may specify a route for connecting the user to the application through the data plane. The data plane may include an authorization component configured to provide zero trust network access authorization to a user requesting access to the application through the data plane. The data plane may include an authentication component configured to provide user authentication to a user requesting access to the application through the data plane.

The system may include a tunnel scaling module 1026 (either in the load balancer 1020, on the connector 1022, or some combination of these) configured to: in response to a new connection request, add a new tunnel between the data plane and the customer premises when each of a number of tunnels between the data plane and the customer premises meets a predetermined threshold for a number of user connections, and in response to the new connection request, add a new connection to one of the number of tunnels when the one of the number of tunnels does not meet the predetermined threshold. The tunnel scaling module 1026 may be further configured to take down one of the number of tunnels between the data plane and the customer premises in response to a second one of the number of tunnels meeting a predetermined criterion. The predetermined criterion for taking down the second one of the tunnels may include each of the connections associated with the tunnel meeting a timeout threshold, e.g., for connection age, inactivity, or some other time-based threshold. The predetermined criterion for taking down the second one of the tunnels may include a minimum threshold for the number of connections for the second one of the tunnels. The tunnel scaling module 1026 may be further configured to migrate one or more remaining connections in the second one of the tunnels to one or more other ones of the number of tunnels.

Figure 11:
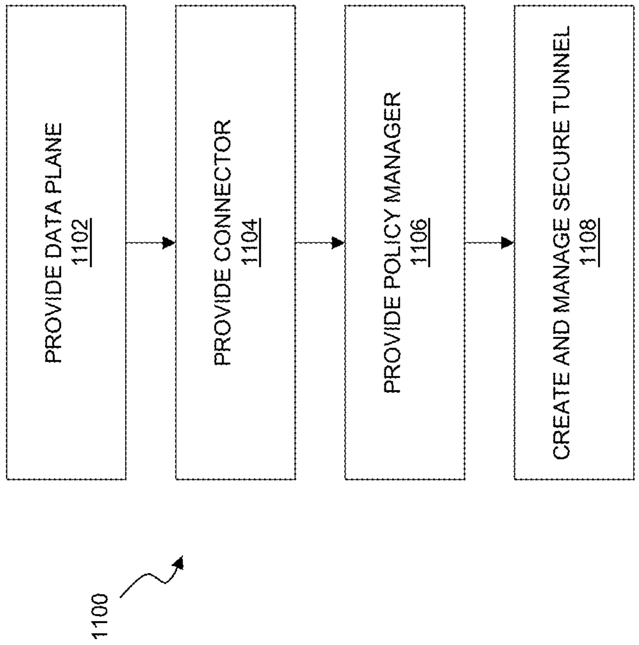
FIG. 11 is a flow chart of a method for managing secure tunnels for a ZTNA data plane.

FIG. 11 is a flow chart of a method for managing secure tunnels for a ZTNA data plane.

As shown in step 1102, the method 1100 may include providing a data plane for zero trust network access. This may include any of the ZTNA data planes described herein. For example, the data plane may be deployed in a cloud platform external to a customer premises, and the data plane may include a tunnel component such as the connection server described above executing in the data plane. The tunnel component may be configured to manage secure tunnels between the data plane and the customer premises. In one aspect, providing a data plane may include hosting the data plane for zero trust network access on a cloud platform external to a customer premises. The data plane may include a secure tunnel component. The secure tunnel component may convert traffic in the data plane to TCP traffic for communication with the connector.

As shown in step 1104, the method 1100 may include providing a connector, such as by executing a connector on a network component of a customer premises, or otherwise hosting, executing, or making available a connector for coupling applications on the customer premises to a ZTNA data plane. In general, the customer premises may host an application, and the connector may be configured as described herein remotely using a threat management facility for the customer premises. For example, the connector may be configured to communicate with the data plane through a secure tunnel created using a tunnel component of the data plane, and the connector may be configured to provide zero trust network access to the application for an external user through the data plane using the secure tunnel. The network component may, for example, include a firewall for the customer premises, and the connector may execute on the firewall. The network component may also or instead include a gateway for an enterprise network of the customer premises.

In one aspect, the threat management facility executes on a second cloud platform external to the customer premises and external to the cloud platform hosting the data plane. In another aspect, the tunnel component may include a WebSocket server.

As shown in step 1106, the method 1100 may include providing a policy manager such as any of the authorization services, authentication services, or other security or policy services described herein. For example, the method 1100 may include providing a policy manager executing on a WebSocket server and authorizing application traffic using Open Policy Agent. In another aspect, providing a policy manager may include authorizing application traffic with a policy manager executing in the data plane. Authorizing application traffic may further include authorizing application traffic using Open Policy Agent.

As shown in step 1108, the method 1100 may include creating and managing tunnels to connectors for incoming user connections. In one aspect the connector may be configurable by the threat management facility to provide zero trust network access through either (a) the secure tunnel and the data plane or (b) a direct user connection to the firewall on the customer premises.

Figure 12:
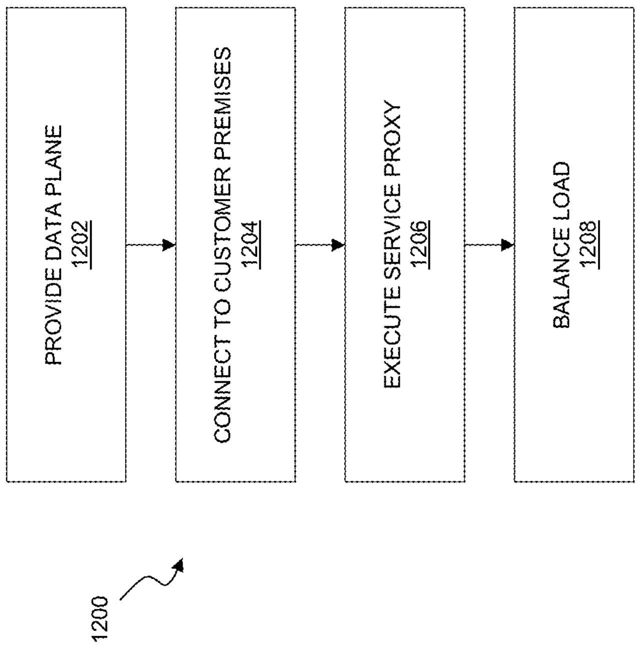
FIG. 12 is a flow chart of a method for load balancing in a cloud-based ZTNA data plane.

FIG. 12 is a flow chart of a method for load balancing in a cloud-based ZTNA data plane.

As shown in step 1202, the method may include providing a cloud-based data plane for zero trust network access to an application hosted on a customer premises.

As shown in step 1204, the method may include connecting the data plane to the customer premises with a plurality of connection servers in the cloud-based data plane. Each of the plurality of connection servers may be configured to connect to the customer premises for zero trust network access to the application. For example, this may include executing a plurality of connection servers in the cloud-based data plane, each connection server configured to connect to the customer premises for zero trust network access to the application. As described herein, the connections between the data plane and the customer premises may be made using secure tunnels configured by a user and created using a connector executing on the customer premises.

As shown in step 1206, the method may include executing a service proxy in the cloud-based data plane, and handling incoming requests for the application at the cloud-based data plane with a service proxy. In general, steps 1202-1206 may use any of the ZTNA infrastructure and steps described herein.

As shown in step 1208, the method 1200 may include load balancing access to the applications with a load balancer executing in the data plane and using globally available information provide by connectors, connection servers, and the like, and stored in a data store for use by the load balancer. In one aspect, load balancing may include load balancing access to the application in the cloud-based data plane by retrieving connection information for the cloud-based data plane and providing load balancing information to the service proxy that specifies one of the plurality of connection servers to connect the user to the customer premises for use of the application, or otherwise provides path information for how the service proxy should direct a new connection through the data plane to a secure tunnel to the customer premises.

In one aspect, the connection information may include a connection count for each of a number of secure tunnels from the plurality of connection servers to the customer premises. The connection information may also or instead include load balancing information based on connection counts for each of a number of tunnels between the plurality of connection servers and the customer premises. The method 1200 may further include executing a tunnel scaling module in the cloud-based data plane, wherein the tunnel scaling module configured to: in response to a new connection request, add a new tunnel between the data plane and the customer premises when each of a number of tunnels between the data plane and the customer premises meets a predetermined threshold for a number of user connections, and in response to the new connection request, add a new connection to one of the number of tunnels when the one of the number of tunnels does not meet the predetermined threshold. The tunnel scaling module may be further configured to take down one of the number of tunnels between the data plane and the customer premises in response to a second one of the number of tunnels meeting a predetermined criterion such as a connection count limit.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code embodied in non-transitory computer readable media that, when executing on one or more computing devices, causes the one or more computing devices to perform any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention.

What is claimed is:

1. A system comprising:

a network component deployed on a customer premises, the network component managing access to the customer premises from an external network;

a threat management facility configured to:

remotely provide security services for the customer premises, remotely manage the network component on the customer premises through a secure connection, and provide a web based user interface for a user to manage the network component through the threat management facility;

an application hosted on the customer premises;

a data plane for zero trust network access, wherein:

the data plane is deployed in a cloud platform external to the customer premises, the cloud platform includes authentication components and authorization components for zero trust network access through the data plane, and the cloud platform includes tunnel components for creating secure tunnels for zero trust network access traffic; and a connector, wherein:

the connector is deployed as a binary executing on the network component, the threat management facility associates the connector with the network component, the threat management facility provides management of the connector to the user through the web based user interface of the threat management facility, the connector is configured to communicate with the data plane through a secure tunnel created using the tunnel components of the cloud platform, the connector is configured to manage zero trust network access to the application through the data plane using the authentication components and the authorization components of the cloud platform, and the connector is further configured to controllably support zero trust network access to the application through the network component.

2. The system of claim 1, wherein the network component includes a firewall for the customer premises.

3. The system of claim 2, wherein the connector is configurable through the web based user interface of the threat management facility to provide access to the application through either a first endpoint connection from thean external network to the firewall on the customer premises or a second endpoint connection from the external network to the data plane for zero trust network access.

4. A computer program product comprising computer executable code embodied in non-transitory computer readable media that, when executing on one or more computing devices, causes the one or more computing devices to perform the steps of:

storing authentication components and authorization components for a data plane of a cloud-based zero trust network access service on a cloud platform;

storing a connector for zero trust network access on a customer premises;

coupling the connector to a threat management facility;

receiving configuration information for the connector from the threat management facility, the configuration information identifying an application on the customer premises to offer as a zero trust network access service, wherein the data plane on the cloud platform supports agentless application access to the application and agent-based application access to the application;

coupling the connector through a secure tunnel to the cloud platform;

coupling the connector to the application on the customer premises; and managing zero trust network access to the application by a user through the data plane by authorizing and authenticating the user for the application with the authentication components and the authorization components executing on the cloud platform.

5. The computer program product of claim 4, wherein the application includes one or more of a productivity application, a database application, and a financial application.

6. The computer program product of claim 4, wherein the authentication components include at least one Open Authorization 2.0 proxy.

7. The computer program product of claim 4, wherein the authorization components include at least one Open Policy Agent.

8. The computer program product of claim 4, wherein the connector includes a data plane client for secure communications with the data plane of the cloud-based zero trust network access service.

9. The computer program product of claim 4, wherein the connector includes a cloud agent for secure communications with the threat management facility.

10. The computer program product of claim 4, further comprising code that performs the step of executing the connector on a firewall on the customer premises.

11. The computer program product of claim 10, wherein the connector periodically transmits a heartbeat to the threat management facility containing health status information for the firewall.

12. A method comprising:

storing an authentication component and an authorization component for a data plane of a cloud-based zero trust network access service on a cloud platform;

storing a connector for zero trust network access on a customer premises;

executing the connector on a firewall on the customer premises, wherein the connector periodically transmits a heartbeat to a threat management facility, the heartbeat containing health status information for the firewall;

coupling the connector to the threat management facility for the customer premises;

receiving configuration information for the connector from the threat management facility, the configuration information identifying an application on the customer premises to offer as a zero trust network access service;

coupling the connector to a cloud-based data plane for the zero trust network access service;

coupling the connector to the application on the customer premises; and managing zero trust network access to the application by a user through the cloud-based data plane by authorizing and authenticating the user for the application with the authentication component and the authorization component configured through the threat management facility and executing in the cloud-based data plane.

13. The method of claim 12, wherein the authentication component includes an Open Authorization 2.0 proxy.

14. The method of claim 12, wherein the authorization component includes an Open Policy Agent.

15. The method of claim 12, wherein the cloud-based data plane executes on a cloud platform remote from the customer premises.

16. The method of claim 12, wherein the threat management facility executes on a cloud platform remote from the customer premises.

17. The method of claim 12, wherein coupling the connector to the cloud-based data plane includes coupling the connector through a secure tunnel to a cloud platform for the cloud-based data plane using one or more secure tunnel components of the cloud platform.

18. The method of claim 12, further comprising storing tunnel components, authentication components, and authorization components for the cloud-based data plane on a cloud platform remote from the customer premises.

19. The method of claim 12, wherein the connector is configurable through a web based interface of the threat management facility.

20. The method of claim 12, wherein the application includes one or more of a productivity application, a database application, and a financial application.

* * * * *